(12) United States Patent
Lee et al.

(10) Patent No.: US 10,971,112 B2
(45) Date of Patent: Apr. 6, 2021

(54) DYNAMICALLY-THEMED DISPLAY UTILIZING PHYSICAL AMBIENT CONDITIONS

(71) Applicant: SAP SE, Walldorf (DE)

(72) Inventors: Jeong-Sook Lee, Walldorf (DE); Christina Hall, Dielheim (DE); Gisbert Loff, Hockenheim (DE); Philip Miseldine, Karlsrue (DE); Charles Monte, San Rafael, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/188,761

(22) Filed: Nov. 13, 2018

(65) Prior Publication Data

US 2019/0096363 A1   Mar. 28, 2019

Related U.S. Application Data

(62) Division of application No. 15/290,820, filed on Oct. 11, 2016, now Pat. No. 10,297,227.

(60) Provisional application No. 62/242,696, filed on Oct. 16, 2015.

(51) Int. Cl.
| | |
|---|---|
| G09G 5/06 | (2006.01) |
| G06F 8/38 | (2018.01) |
| G06F 9/451 | (2018.01) |
| G06T 11/00 | (2006.01) |
| G06T 11/20 | (2006.01) |

(52) U.S. Cl.
CPC ............... *G09G 5/06* (2013.01); *G06F 8/38* (2013.01); *G06F 9/451* (2018.02); *G06T 11/001* (2013.01); *G06T 11/203* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 6,476,804 B1* | 11/2002 | Costabel | G06T 13/20 345/419 |
| 9,841,880 B1 | 12/2017 | Beaty | |
| 10,297,227 B2 | 5/2019 | Lee et al. | |
| 2003/0071824 A1* | 4/2003 | Gonsalves | G11B 27/034 345/589 |
| 2008/0092057 A1 | 4/2008 | Monson et al. | |
| 2009/0260022 A1 | 10/2009 | Louch et al. | |

* cited by examiner

*Primary Examiner* — Nurun N Flora
(74) *Attorney, Agent, or Firm* — Sterne, Kessler, Goldstein & Fox P.L.L.C.

(57) ABSTRACT

Configuring a graphical user interface according to a user's preferences is described herein. Systems and methods are provided for generating a dynamically varying themed interface for a user environment; defining appropriate color palettes associated within a brand definition of the user environment; and, providing one or more configuration settings for the rendering engine.

18 Claims, 18 Drawing Sheets

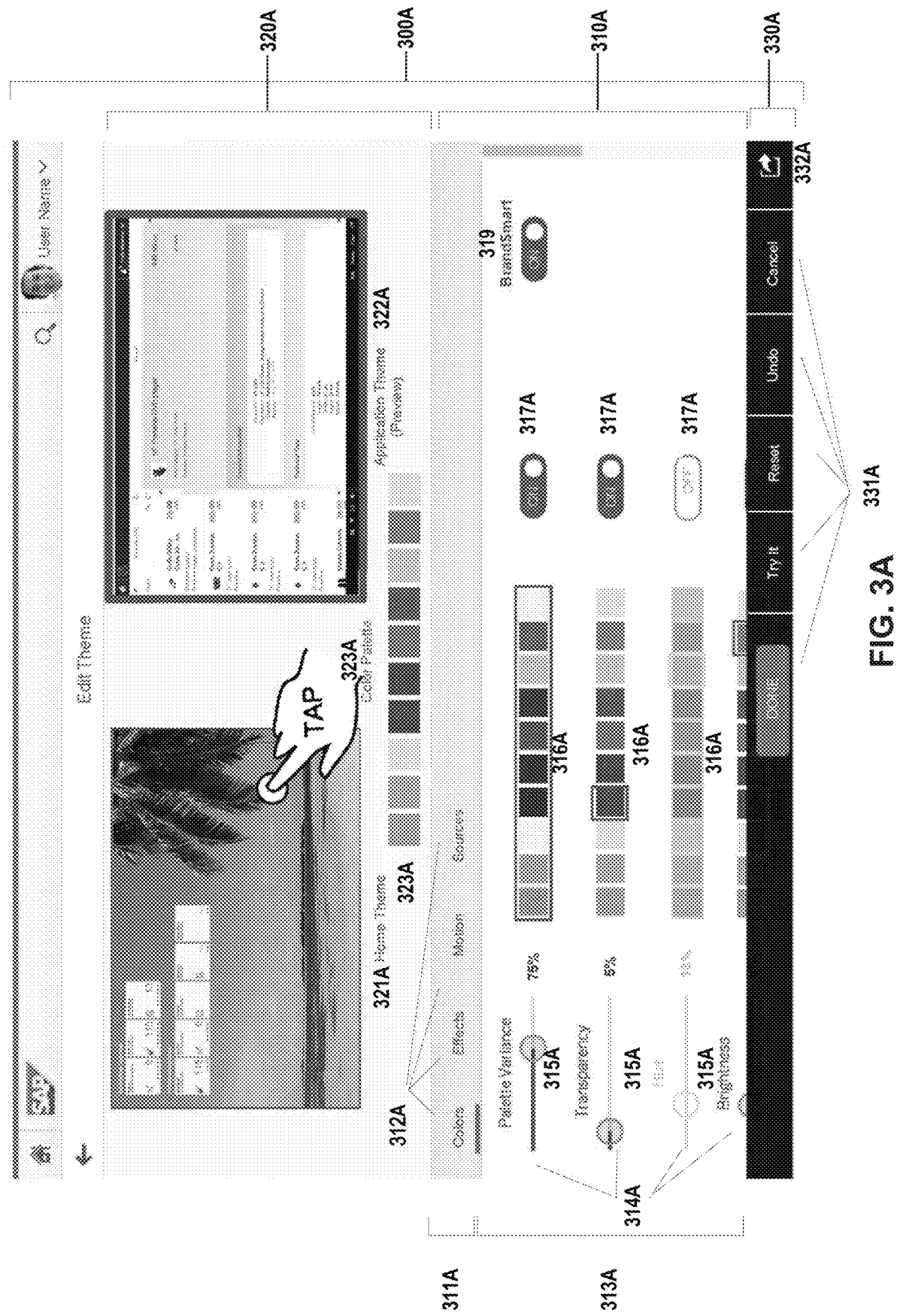

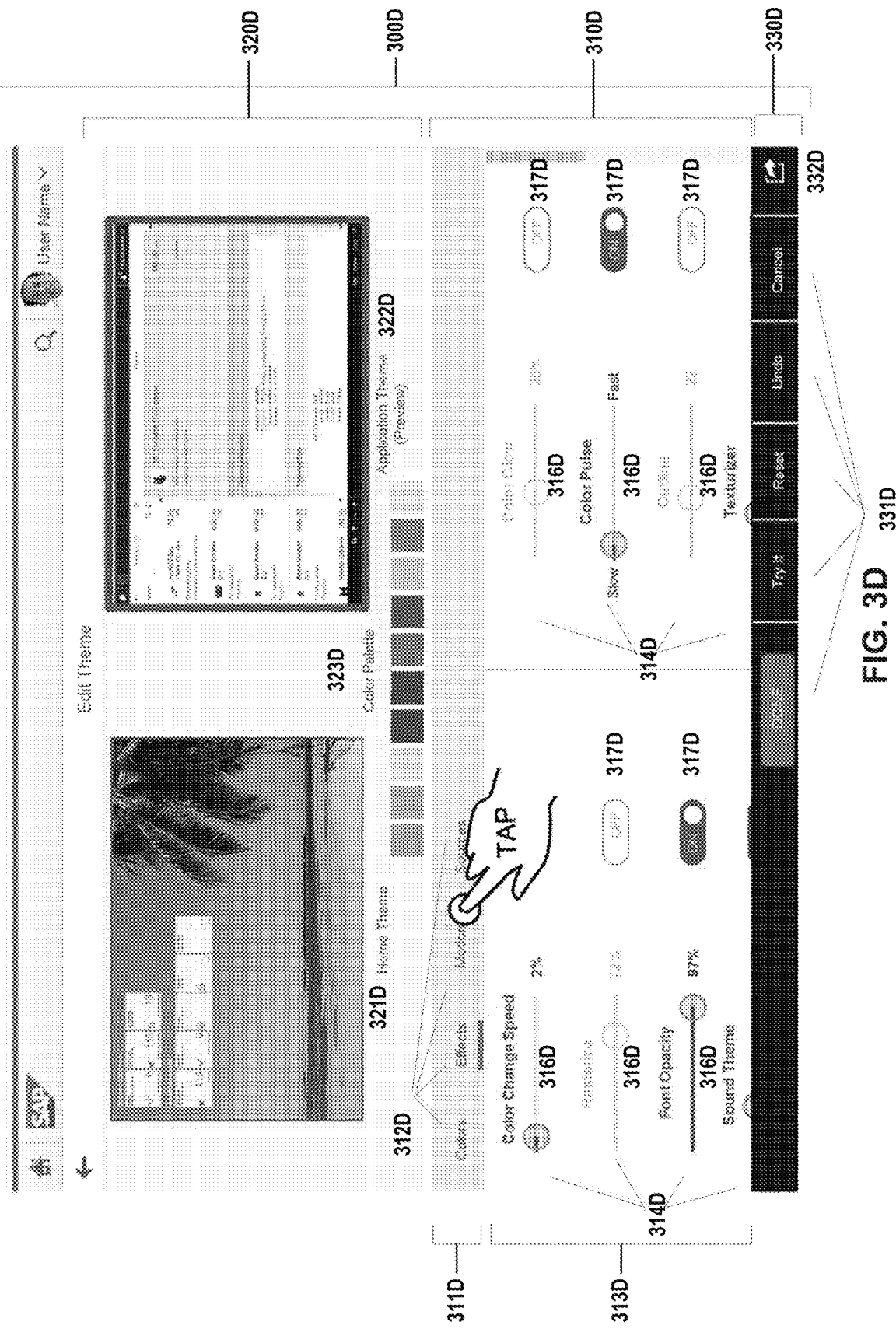

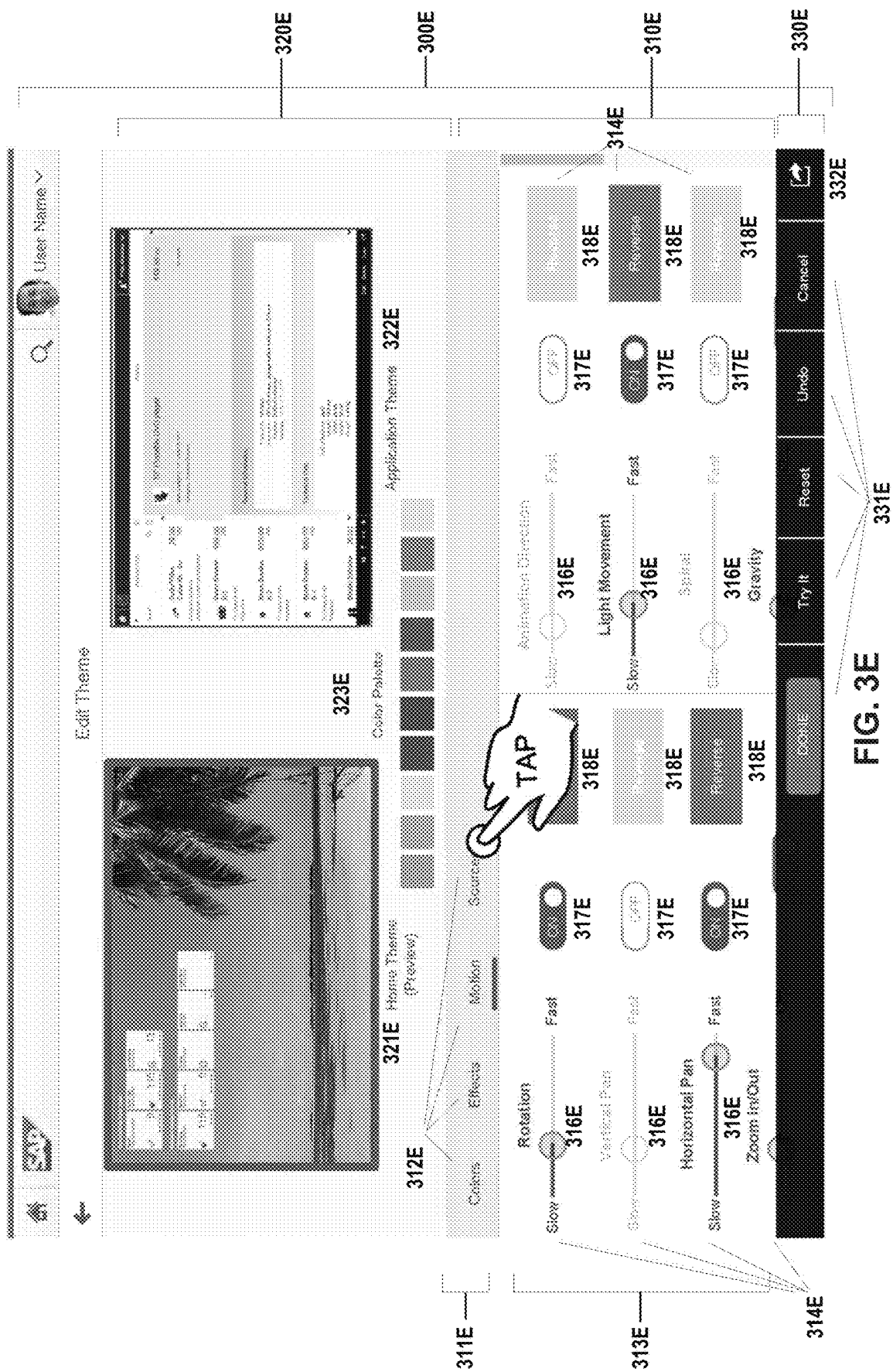

DYNAMICALLY-THEMED DISPLAY UTILIZING PHYSICAL AMBIENT CONDITIONS

CROSS-REFERENCE TO RELATED APPLICATIONS

This application is a Divisional of U.S. application Ser. No. 15/290,820, filed Oct. 11, 2016, which claims the benefit of U.S. Provisional Patent Application No. 62/242,696, entitled "DYNAMICALLY-THEMED DISPLAY UTILIZING PHYSICAL AMBIENT CONDITIONS," filed on Oct. 16, 2015, all of which are incorporated herein in their entirety.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

Utilities for theming software applications are known in software applications and products. Themes persistently deploy a color palette (static set of colors and color effects) that is applied to UI elements, components, backgrounds, text, icons, logos, and user interactions that provide visual affordances (e.g. click/tap selections, mouse rollover, and selected control states, etc.). Theme color palettes can represent a company or product brand, a location within an application, or simply a preferred set of aesthetic colors which collectively impart a "brand experience." Additionally, the brand color palette and specific assignments to various UI elements determine the level of readability and usability known as "accessibilities" that are carefully chosen to create a consistent, intuitive, recognizable, and delightful user experience for operating the software.

However, a user's repetitive experience of a persistent theme color palette can easily become boring and mundane when using the branded software product over and over again, especially in enterprise environments when users engage in software on a daily basis. Additionally, individual users have their own color preferences and tastes making it impossible to satisfy everyone with a single color set.

A brand experience is crucial for emulating the identity of a company or product, but when combined with interaction states and accessibilities requirements, making changes to a brand color palette is very complex and difficult to do, and can risk the effectiveness for communicating the brand identity as well as usability.

BRIEF DESCRIPTION OF THE DRAWINGS

FIGS. 3A-3H show an example GUI for configuring color-based aspects of a user theme, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Example embodiments of the present disclosure provide for a method, device, system, and computer program product for configuring a graphical user interface according to a user's preferences; for dynamically adjusting elements and components of the graphical user interface according to user contexts and data; and for automatically theming a graphical user interface according to a user-provided artifact.

Provided is a highly flexible, automated system that deploys an array of methods and systems to vary a user's experience of a theme in a software product without sacrificing usability or, in the instance of a branded theme, without sacrificing usability or violating the intimacy of the brand color palette. In certain embodiments, the system may dynamically introduce non-repetitive subtle variations in color tones and effect (e.g. color shade, hue, opacity, transparency, rasterization, sharpness, etc.) in an animated fashion. The system may also incorporate animating graphical elements that can relate to a brand as well as communicate useful application information to users (e.g. the positive/negative status of the application, task completeness, etc.).

In certain embodiments, the theme incorporates parameters for brand elements and effect changes in ways that do not violate the intent of the brand. These automated changes can be driven by various methods and combinations of methods, including without limitation application data as determined by user actions in conjunction with mathematical algorithms, auto-randomizers, or user configuration of elements of the theme. In certain embodiments, the elements of the theme may include without limitation colors, shapes, motions, and sounds, all of which may be dynamically varied according to the present disclosure.

In certain embodiments, the theme includes a brand definition that constrains a user's configuration to values or parameters within the defined brand. In this way, a user's theme may be customized, but only to the extent that it does not interfere with usability or violate the intimacy of the brand color palette. In certain embodiments, the brand definition may be turned off, allowing the user to configure their themed environment without constraint.

A brand definition may be created, managed, etc. by among others an administrator who may employ among other things any number of mechanisms (including for example an Application Programming Interface (API), a web-based or other interface, etc.) and who may be identified, controlled, etc. by among other things access credentials, roles/duties/etc., operational rules/rights/etc. (through for example an Access Control List (ACL)), etc.

Figure 1:
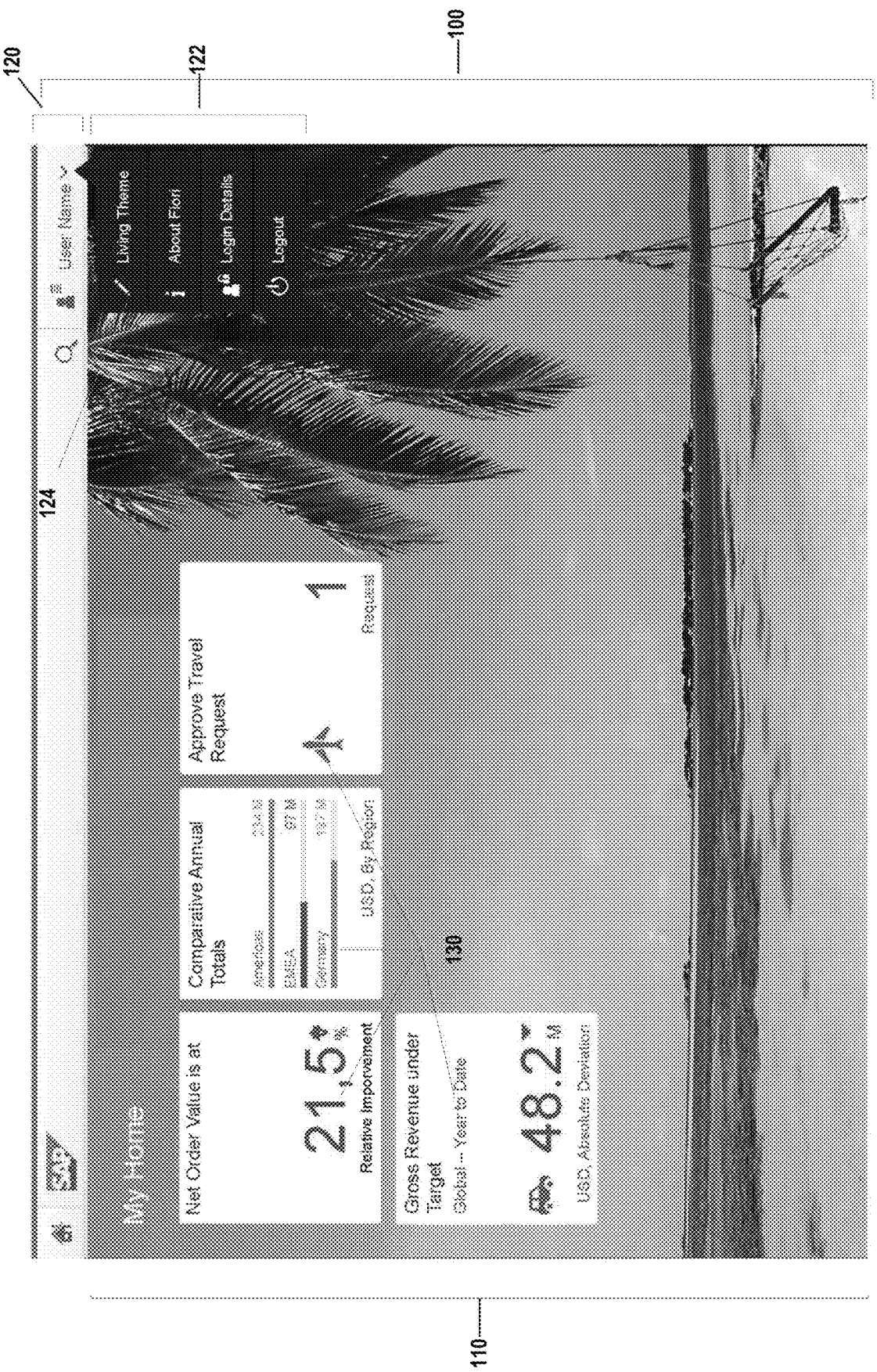
FIG. 1 shows an example graphical user interface (GUI) of a user home screen, according to some embodiments.

FIG. 1 shows a graphical user interface (GUI) 100 of an application home screen having a particular theme, according to an embodiment. The GUI 100 may include among other things a background area 110, a menu bar area 120, and application tiles 130. The background area 110 may display an embedded image or video, or provide other animated effects. The menu bar 120 may include an option menu 122 providing selectable elements 124 providing access to other aspects of the application. In certain embodiments, the selectable elements 124 may include a theming option by which to launch the theme selection and configuration area of the user environment. The application tiles 130 may display information, data, requests, deadlines, and other business information associated with the respective application. The application tiles 130 may be selectable by the user, and selection by the user may launch the respective application. The respective application, when launched, may utilize the same theme, although aspects of the theme in the application environment may be configurable independently of the theme settings in the home screen environment.

A user environment may comprise aspects of an enterprise software system and may apply modern design principles for a completely reimagined user experience that among other things delivers a personalized, responsive, seamless, and simple user experience across applications (including legacy and new), devices (including, inter alia, desktop computer, notebook computer, laptop computer, tablet, smartphone, smart watch, etc.), and deployment options (such as for example on-premise, cloud, as-a-service, etc.).

Background area 110 may comprise a still image, a video, or a combination of image(s) and/or video(s). The background area may be selected from a preset list provided within the user environment, or from an external source. The image(s) that comprise the background area may be of any resolution or format, including, but not limited to, common raster formats such as JPEG, Exif, TIFF, GIF, BMP, PNG, WEBP or others, or common vector formats such CGM, SVG, or others. In certain embodiments, the image(s) are in vector formats that allow for machine-based manipulation of their content. In certain embodiments, the machine-based manipulation of the content includes the ability to scale to any device form size without loss of clarity. In some embodiments, the user environment may convert a common raster format image to a common vector format image. This conversion ensures the above mentioned images can be scaled to any device form size without loss of clarity. The video(s) that comprise the background area may be of any resolution or format, including, but not limited to, WEBM, MKV, FLV, VOB, OGG, AVI, MOV, WMV, MPG, MP4, M4V, 3GP, 3G2, or others. In certain embodiments, the video comprises a vector-based animation. In certain embodiments, the video comprises a vector-based animation in SVG format.

Figure 2:
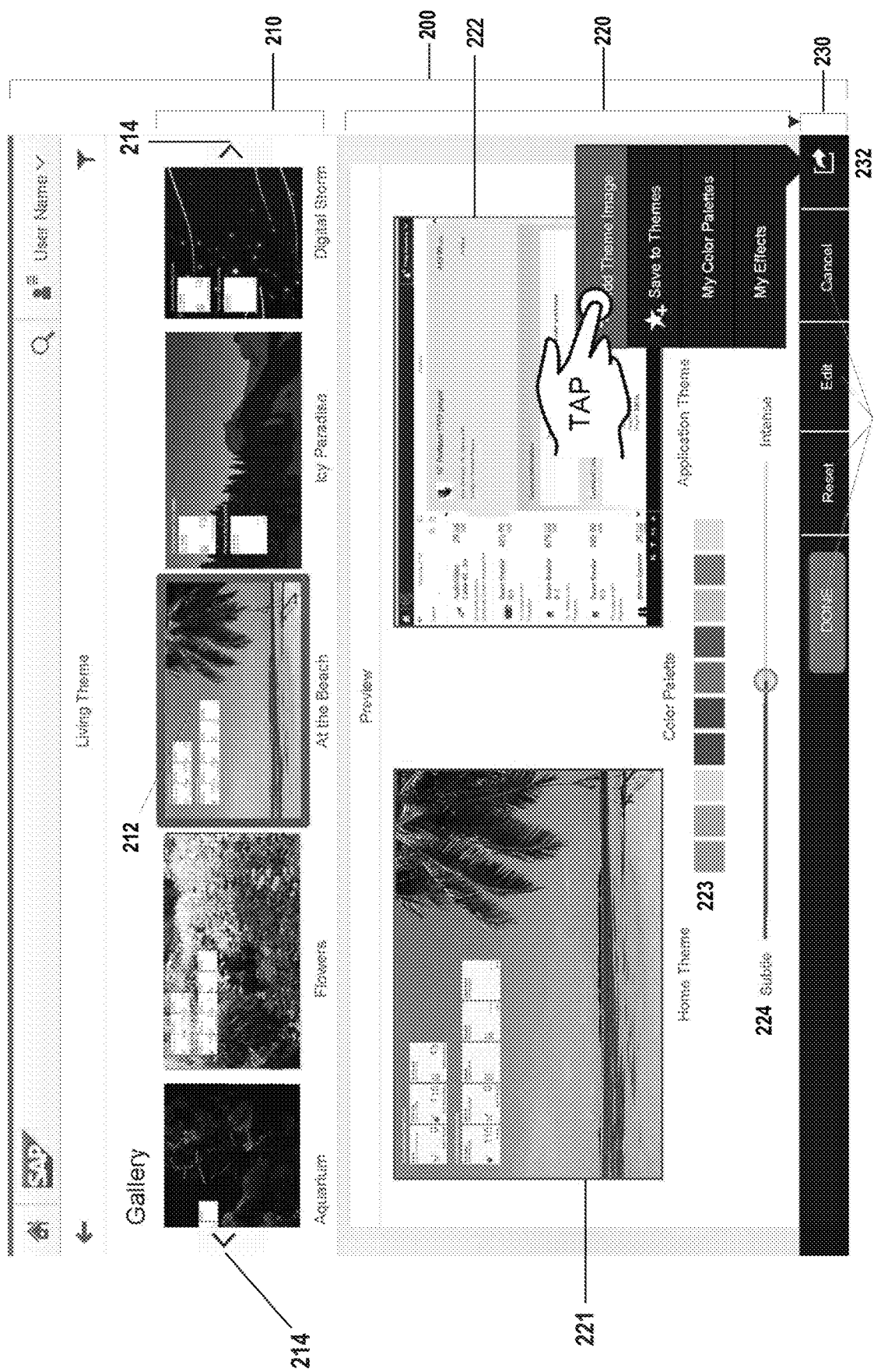
FIG. 2 shows an example GUI for previewing and selecting a user theme, according to some embodiments.

FIG. 2 shows a GUI 200 for previewing and selecting a user theme, according to an embodiment. The GUI 200 provides a gallery area 210, a preview area 220, and a theme menu bar area 230. The gallery area 210 may include any number of preset themes 212 defined for the user environment. Navigation arrows 214 allow the user to scroll through the list of preset themes 212. A user may select a preset theme 212 which is previewed in preview area 220.

The preview area 220 comprises a home theme preview area 221 and an application theme preview area 222. The home theme preview area 221 displays the selected preset theme 212 as applied to a home screen, such as that shown in FIG. 1. Application theme preview area 222 displays the selected preset theme 212 as applied to the applications of the user environment. Preview area 220 also includes a color palette 223 that comprises the colors associated with the selected theme 212. Color palette slider 224 allows the user to vary the colors of color palette 223. A more subtle color palette may decrease the variance, hue, tint, shade, tone, saturation, lightness, chroma, intensity, brightness, or other characteristics of color palette 223, while a more intense color palette may increase the variance, hue, tint, shade, tone, saturation, lightness, chroma, intensity, brightness, or other characteristics of color palette 223.

Theme menu bar area 230 comprises selectable options 231 related to the theming of the user environment. In certain embodiments, the options 231 comprise "Done," "Reset," "Edit," "Cancel," and a theme option list 232. If the user selects "Done," the user environment may return to the home screen or an application of the user environment with the selected theme 212 applied. If the user selects "Reset," the selected theme 212 and related parameters are returned to their original values. In some embodiments, the original values or the related parameters may be a preset default state. In some embodiments, the original values may be the values as set when the user entered the theme selecting and configuration area of the user environment. If the user selects "Edit," the theme configuration area of the environment may be launched. If the user selects "Cancel," the user environment may return to the home screen or an application of the user environment with the theme and configuration values set as when the user entered the theme selecting and configuration area of the user environment. If the user selects the theme option list 232, additional options may be displayed. For example, a user may be presented with the options of "Add Theme Image," "Save to Themes," "My Color Palettes," and "My Effects." If the user selects "Add Theme Image," the image import area of the environment may be launched. If the user selects "Save to Themes," the particular configuration of theme elements and configuration values may be saved and stored for later recall and the newly-saved theme may appear in gallery area 210. If the user selects "My Color Palette," the user's color palette's area may be launched. In certain embodiments, the user may select from one or more color palettes under the "My Color Palette" option. If the user selects "My Effects," the user's effects area may be launched.

FIGS. 3A-H show a GUI 300 for configuring aspects of the selected theme 212, according to an embodiment. The GUI 300 provides a configuration area 310, a preview area 320, and a theme menu bar 330. The configuration area 310 may comprise a configuration menu bar 311 and an element configuration area 313. The preview area 320 may comprise a home preview area 321 and an application preview area 322.

Figure 3B:
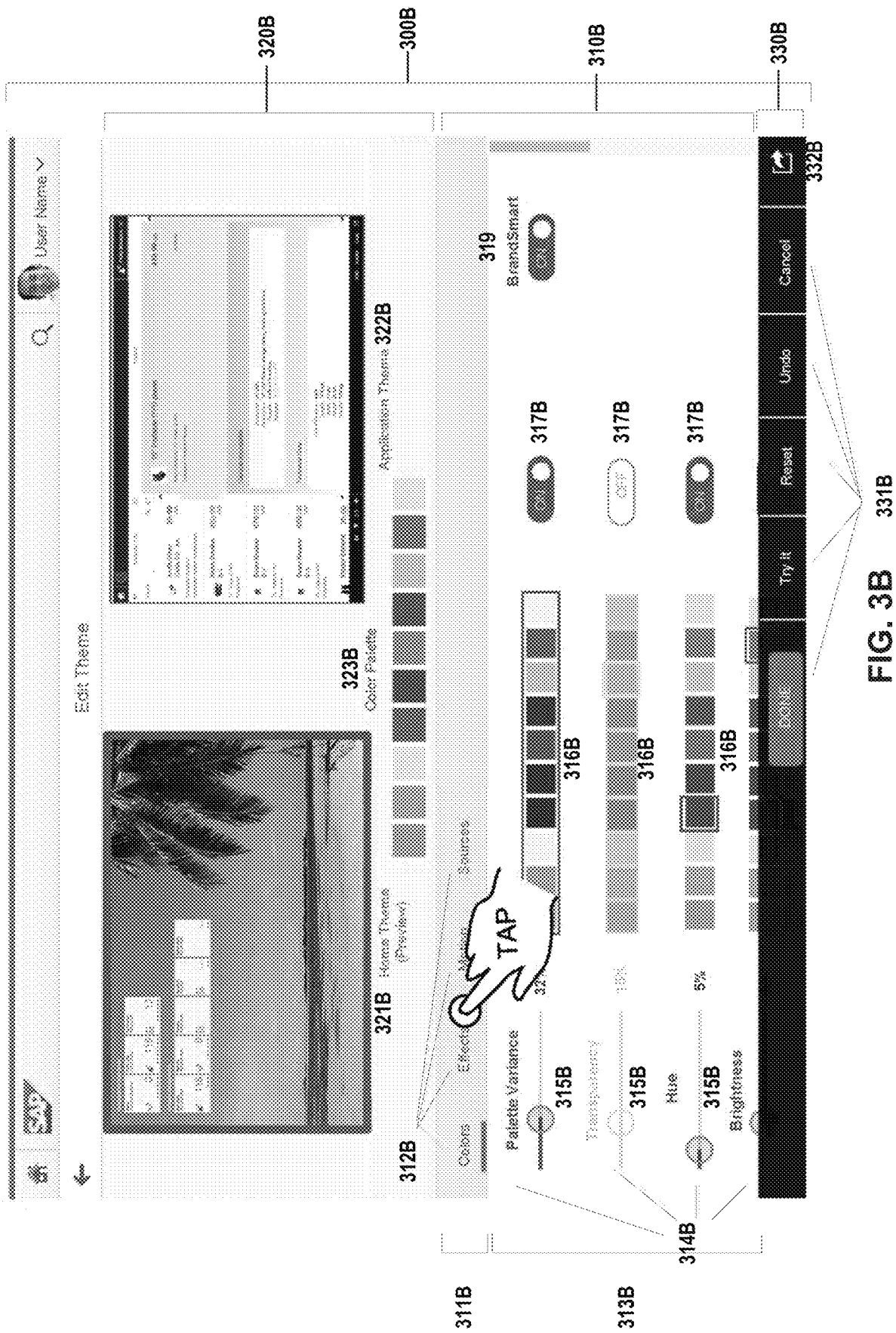

The home preview area 321 and application preview area 322 may be independently selectable and configurable. Upon selection of either home preview area 321 or application preview area 322, configuration area 310 may display the elements and current values associated with the selected theme 212 as applied to the home area or application area, respectively. In this way, users are able to further customize their environment through the ability to configure the theme as applied to the home area and applications of the user environment independently of one another. For example, application preview area 322A is selected in FIG. 3A, and the configuration area 310A displays the elements and current values associated with the selected theme 212 as applied to applications of the user environment. FIG. 3B shows the home preview area 321B as selected, and the configuration area 310B displays the elements and current values associated with the selected theme 212 as applied to the home screen of the user environment. The preview area 320 may also comprise a color palette 323, which may show the color palette associated with the selected preview area, i.e., the home preview area 321 or the application preview area 322.

Figure 3C:
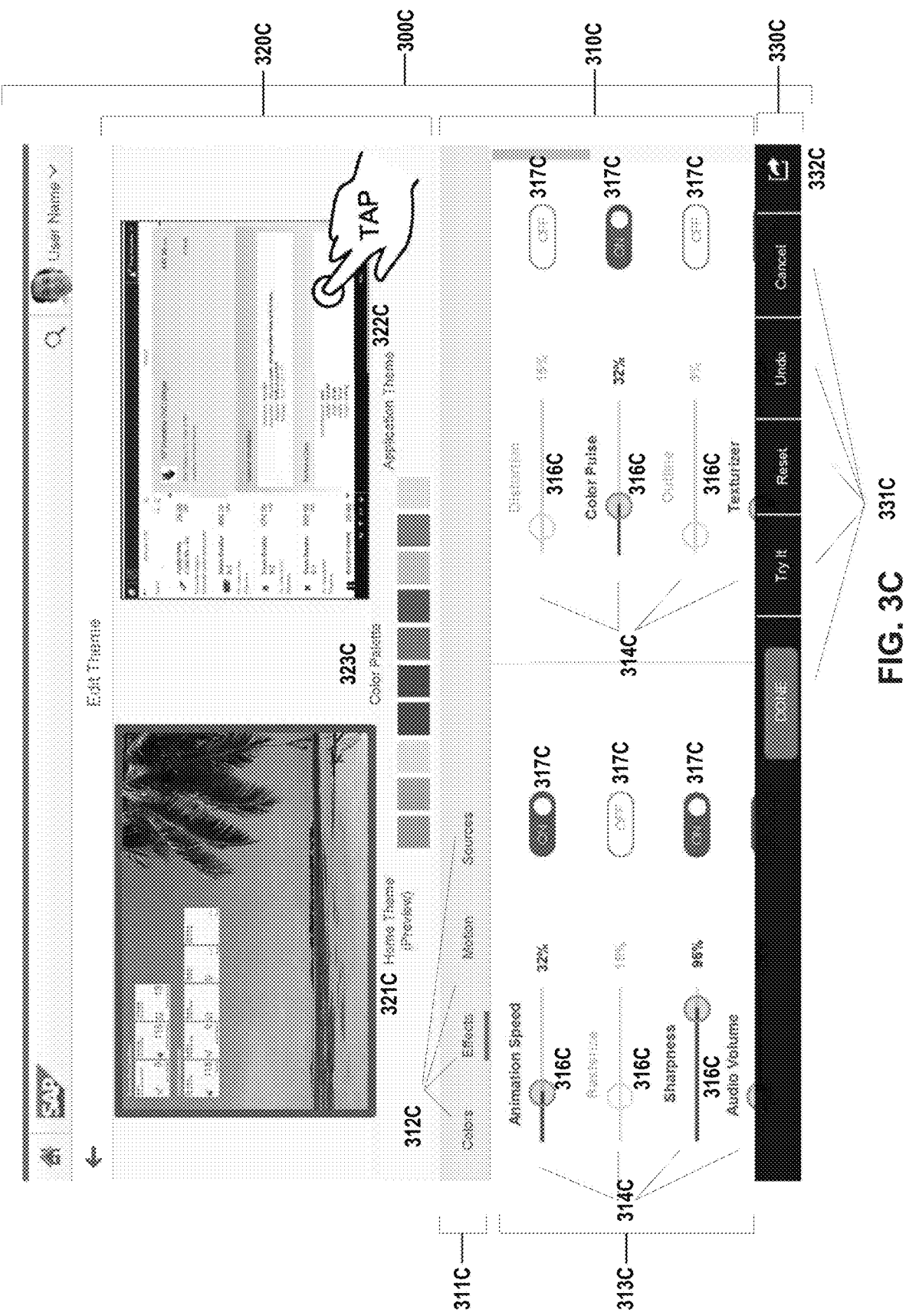
Figure 3G:
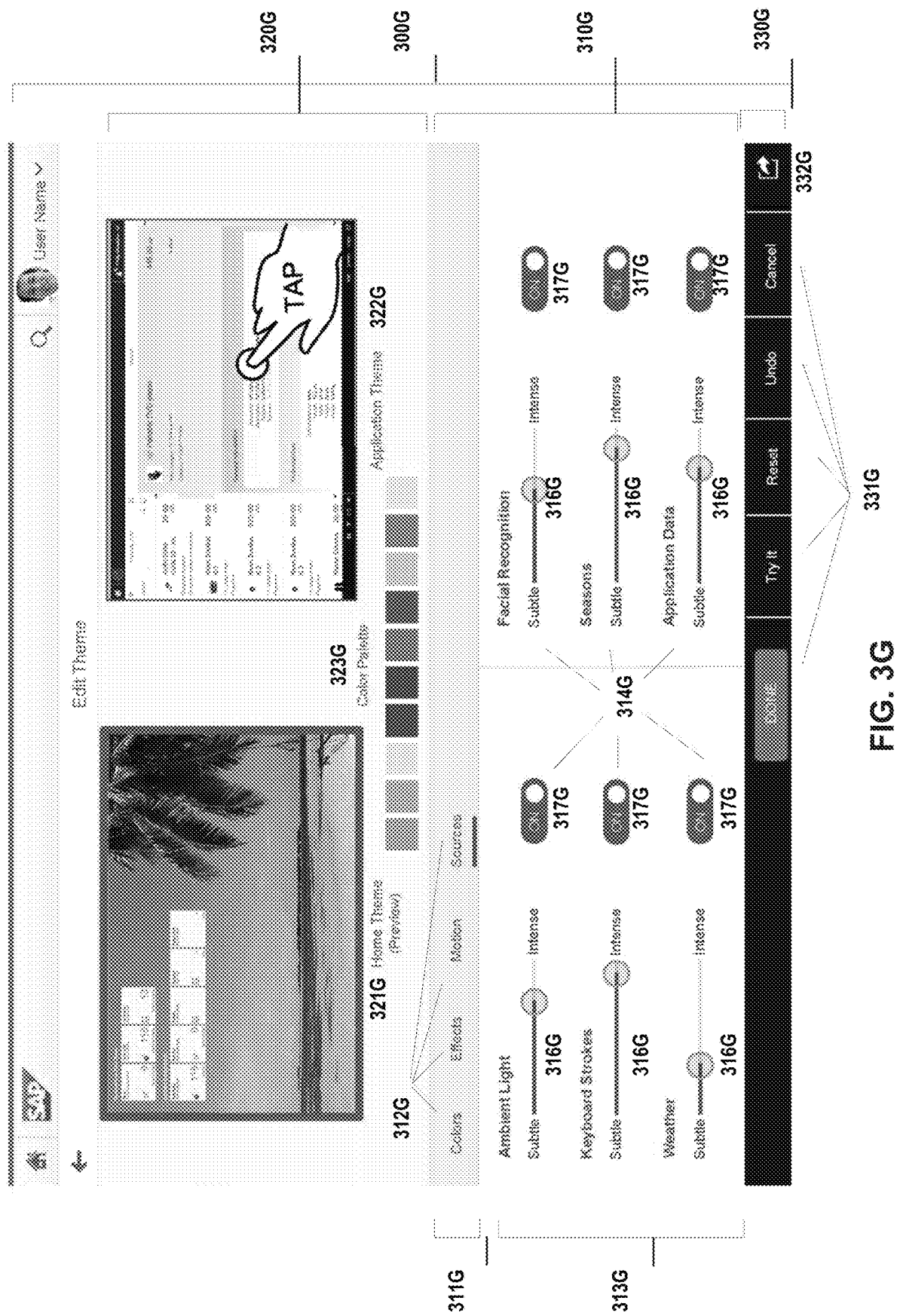
Figure 3H:
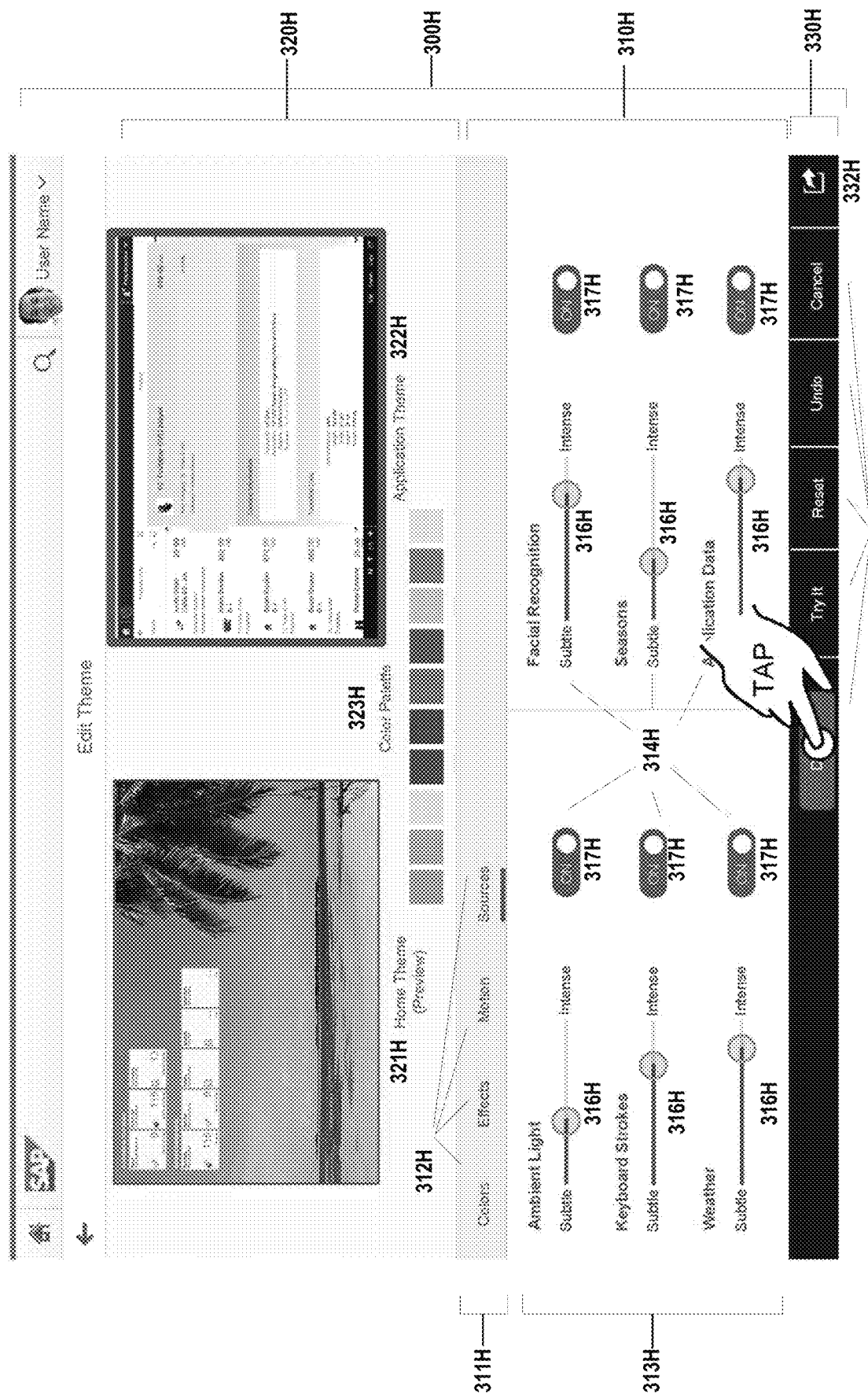

Configuration area 310 may comprise a configuration menu bar 311 and an element configuration area 313. Configuration menu bar 311 may comprise selectable options 312 associated with various aspects of the theme. In some embodiments, configuration menu bar 311 comprises selectable options for "Colors," "Effects," "Motion," and "Sources." User selection of a selectable option 312 may display the theme elements associated with that option in element configuration area 313 and the values associated with the selected preview area. For example, in FIG. 3A, selectable option 312A "Colors" has been selected, and the theme elements associated with "Colors" are displayed in element configuration area 313A, with values associated with the selected theme 212 as applied to applications of the user environment. In FIG. 3B, where home preview area 321B has been selected, the theme elements associated with "Colors" and their values associated with the selected theme 212 are applied to the home screen of the user environment. In FIGS. 3C-D, the selectable option 312 "Effects" has been selected, and the "Effects" theme elements associated with the selected preview area 321 (FIG. 3C) or 322 (FIG. 3D) are shown in element configuration area 313. In FIGS. 3E-F, the selectable option 312 "Motion" has been selected, and the "Motion" theme elements associated with the selected preview area 321 (FIG. 3E) or 322 (FIG. 3F) are shown in element configuration area 313. In FIGS. 3G-H, the selectable option 312 "Sources" has been selected, and the "Sources" theme elements associated with the selected preview area 321 (FIG. 3G) or 322 (FIG. 3H) are shown in element configuration area 313.

Element configuration area 313 may comprise any user-configurable elements 314 of the theme associated with the selectable option 312. For example, the element configuration area 313 in FIGS. 3A and 3B comprises user-configurable elements 314A or 314B associated with "Color." These elements 314A and 314B may be associated with user-configurable aspects of the theme, which may include, for example, "Palette Variance," "Transparency," "Hue," and "Brightness," as shown in FIGS. 3A and 3B, or any other color-based aspect of a theme that may be user-configurable. For example, elements 314A and 314B may be associated with, for example, the selected theme 212's tint, shade, tone, saturation, lightness, chroma, intensity, and/or other characteristic. In some embodiments, all, some, or none of the elements 314A may relate to the same user-configurable aspects of the theme as the elements 314B. One of ordinary skill in the art will appreciate that the aforementioned list is not exhaustive, and any aspect of color typically associated with image or video editing may be associated with a user configurable element 314C and/or 314D within the scope of the present disclosure. As shown in FIGS. 3A and 3B, the user-configurable element 314 associated with "Palette Variance" may comprise a BrandSmart toggle 319 that allows a brand definition to be turned on or off. If BrandSmart toggle 319 is turned on, the user's configuration options may be limited to parameters that fall within a preset brand definition, such that particular palette variations may not be introduced. If BrandSmart toggle 319 is turned off, the user's configuration options may not be limited by any brand definition, and the user may customize their environment according to their preferences along the entire color spectrum.

Element configuration area 313 in FIGS. 3C and 3D displays the user-configurable elements 314C and 314D associated with the option "Effects" for the selected preview area 321 (FIG. 3C) or 322 (FIG. 3D). These elements 314C may include, but are not limited to, at least one or more user-configurable elements such as, animation speed, rasterize, sharpness, audio volume, distortion, color pulse, outline, and texturizer, while elements 314D may include, but are not limited to, at least one or more user-configurable elements such as, color change speed, rasterize, font opacity, sound theme, color glow, color pulse, outline, and texturizer of the image(s) and/or video(s) of the selected theme 212, or elements thereof. As shown by the comparison between FIGS. 3C and 3D, the user-configurable elements 314C and 314D associated with the selected preview areas 321 and 322 may be different. In some embodiments, all, some, or none of the elements 314C may relate to the same user-configurable aspects of the theme as the elements 314D. One of ordinary skill in the art will appreciate that the aforementioned list is not exhaustive, and any effect typically associated with image or video editing may be associated with a user's configurable element 314C and/or 314D within the scope of the present disclosure.

Element configuration area 313 in FIGS. 3E and 3F displays the user-configurable elements 314E and 314F associated with the option "Motion" for the selected preview area 321 (FIG. 3E) or 322 (FIG. 3F). These elements 314E may include, but are not limited to at least one or more user-configurable elements such as, rotation, vertical pan, horizontal pan, zoom in/out, animation direction, light movement, spiral and gravity, while elements 314F may include, but are not limited to, at least one or more user-configurable elements such as, screen transitions, micro transitions, and scroll speed of the image(s) and/or video(s) of the selected theme 212, to name just a few examples. As shown by the comparison between FIGS. 3E and 3F, the user-configurable elements 314E and 314F associated with the selected preview areas 321 and 322 may be different. In some embodiments, all, some, or none of the elements 314E may relate to the same user-configurable aspects of the theme as the elements 314F. One of ordinary skill in the art will appreciate that the aforementioned list is not exhaustive, and any motion-based aspects of a theme may be associated with a user configurable element 314E and/or 314F within the scope of the present disclosure.

Element configuration area 313 in FIGS. 3G and 3H displays the user-configurable elements 314G and 314H associated with the data sources of the user environment. These data sources may be used to dynamically introduce non-repetitive, subtle variation to aspects of the selected theme 212, including variation within any of user-configurable elements 314A-314F. In certain embodiments, user-configurable elements 314G and 314H include, but are not limited to, such data sources as ambient light, keyboard strokes, mouse clicks, weather, facial recognition (including recognition of facial expressions and whether the user is looking at the display), seasons, and application data. Other data sources within the scope of the present disclosure include, but are not limited to, data such as location (e.g., LBS/GPS), timers (e.g., duration of a user's session, frequency of usage, active screen time, event, etc.), calendars (e.g., season, time of year, etc.), cameras (e.g. user orientation, movement, etc.) and/or external data sources (e.g., information on local weather, information on the stock market, etc.). One of ordinary skill in the art will appreciate that the aforementioned list is not exhaustive, and many other data sources may be associated with user configurable element 314G and/or 314H for use in generating data for dynamic variation of selected theme 212.

These data sources may be linked to sensors or sets of sensors that report on the conditions of where the user environment is being displayed. For example, ambient light element 314G and 314H may be linked or connected to a light sensor, weather element 314G and 314H may be linked or connected to a temperature sensor, and facial recognition element 314G and 314H may be linked or connected to a camera. The sensor or sensors may be purpose-built hardware, or software that uses a hardware sensor. The sensor or sensors are able to analyze various ambient aspects of the location where the user environment is being displayed and convert them into digitally retrievable parameters that may be reported to the user environment for storage and later retrieval, or utilized in real-time by the user environment. Application data may be obtained through any typical means, e.g., APIs, interfaces, etc. External data may be obtained through any typical means, e.g., from a device connected remotely to the device on which the user environment is being displayed. The data values of any of these sources may be reported to the user environment for storage and later retrieval, or utilized in real-time by the user environment. This will be further described with respect to FIG. 4 below.

The user environment may use the value as an input to the rendering of the selected theme 212, or the rendering of various user-configurable elements 314 of selected theme 212. For example, a timer may be linked to the selected theme 212's color saturation element, and the colors may desaturate based on the duration of the user's session. In another embodiment, the temperature may be mapped to the chroma and hue of the selected theme 212. The colder the outside temperature is, the warmer the color temperature of the selected theme 212, and vice versa. In another embodiment, the shape, border radius, or line thickness of the selected theme 212 may be linked to the application state such that the shapes vary when the application state is loading, idle, or busy. The edges of the shape may further roughen or smoothen when the idle or busy state duration increases. In another embodiment, the speed, gravity, scale, path, or direction of background animation of the selected theme 212 may be linked to the number of work items a user has on their calendar, with a fuller calendar generating livelier animations and emptier calendar generating slower, more subtle animations. In another embodiment, the animations of selected theme 212 may be tied to a user's update notifications, with more frequent update notifications leading to subtle animations, and vice versa. In another embodiment, the animations of selected theme 212 may be linked to the user's keyboard, with more rapid keystrokes generating livelier animations, and vice versa. In another embodiment, the pitch, timbre, intensity, or duration of sounds of selected theme 212 may be dynamically varied by the clock, with sounds getting increasingly vivid throughout the morning and then progressively softer over the course of the afternoon. In another embodiment, the pitch, timbre, intensity, or duration of the sounds of selected theme 212 may be dynamically varied according to criticality of notifications, with critical notification sounds being more intense. In another embodiment, the pitch, timbre, intensity, or duration of the sounds of the selected theme 212 may be mapped to the user's workflow speed, such that when the user works quickly and triggers many actions within a short time frame, the sounds get shorter. One of ordinary skill in the art will appreciate that the aforementioned list is not exhaustive, and various data sources may be associated with a myriad of parameters of selected theme 212 in any number of relationships for introducing dynamic variation into selected theme 212 within the spirit of present disclosure.

As shown in FIGS. 3A-B, user-configurable elements 314 may comprise sliders 315, color selector 316, and toggle(s) 317; FIGS. 3C-H illustrate example user-configurable elements 314, which may comprise sliders 316 and toggle(s) 317. Sliders 315 may be used to adjust the value of the user-configurable aspect associated with the element 314. For example, FIG. 3A shows that palette variance is set to 75%, transparency is set to 5%, and hue is toggled "off". As slider 315A is adjusted, the color palette 323 may be updated in real-time to display the resulting color palette according to the new values, and the selected preview area may be updated to display a preview of the environment area according to the new values. Color selector 316A may allow for the user to select one, some or all of the colors associated with the selected theme 212's color palette. For example, all of the colors of color selector 316A associated with palette variance in FIGS. 3A and 3B are selected, while a single color of color selector 316A associated with transparency in FIG. 3A and a single color of color selector 316A associated with hue in FIG. 3B. Slider 315A may adjust the value of the color(s) selected in color selector 316A. In this manner, the individual colors of the color palette of the theme may be configured according to a user's preferences, allowing further customization and personalization of the theme. The sliders 316C-316H in FIGS. 3C-H function in a similar manner to that described with respect to FIGS. 3A and 3B. For example, as shown in FIG. 3C, slider 316C associated with animation speed is currently set to 32%, and may be varied between 0% and 100%. As the user varies the slider, the home preview area 321C refreshes in real-time to display a preview of selected theme 212 according to the newly-selected value. Similarly, slider 316E associated with rotation in FIG. 3E, may be varied to adjust the rotation speed of the background, with home preview area 321E refreshing accordingly. The sliders 316G and 316H allow the user to customize the level by which a particular data source may introduce dynamic variation into the selected theme 212. For example, in FIG. 3G, slider 316G associated with, for example, ambient light, may be used to adjust the level by which the ambient light level introduces dynamic variation into the selected theme 212. A subtler setting may introduce only minor dynamic variation in the theme, while a more intense setting may introduce more significant dynamic variation in the theme, according to variations in the ambient light level.

In certain embodiments, toggles 317A-H in FIGS. 3A-H provide for the dynamic variation associated with a particular theme element or data source to be turned "on" or "off." For example, in FIG. 3A, the toggle 317A associated with the hue element 314A is set to "off." Accordingly, the hue values of the theme may be dynamically varied within the applications of the user environment when the associated toggle 317A is set to "on". However, as toggle 317B associated with hue element 314B is set to "on," the hue values of the theme may be dynamically varied within the home screen of the user environment. Toggles 317C-317H function in a similar manner to that described with respect to toggles 317A and 317B in FIGS. 3A and 3B. For example, in both FIGS. 3C and 3D, the toggles 317C and 317D associated with the rasterize elements 314C and 314D, respectively, are set to "off." Accordingly, no dynamic variance in the rasterization of the theme will be introduced in either the home screen or applications of the user environment. In FIG. 3G, all of the toggles 317G are set to "on."

Accordingly, all of the data sources are available to supply the data by which dynamic variance in the theme may be introduced.

Other controls associated with a particular element 314 may include, without limitation, buttons, switches, input areas for text entry, etc. For example, as shown in FIG. 3E, elements 314E further comprise a "Reverse" button 318E. In some embodiments, activation of the "Reverse" button 318E reverses the direction of movement of the associated element 314E. For example, if a user activates the "Reverse" button 318E associated with rotation, theme elements such as the image(s) and/or video(s) associated with the background may rotate counter-clockwise, while those elements may rotate clockwise if the "Reverse" button is not activated.

As shown in FIGS. 3A-3H, theme menu bar area 330 comprises selectable options 331 related to the theming of the user environment. In certain embodiments, the options 331 comprise "Done," "Try It," "Reset," "Undo," "Cancel," and a theme option list 332. If the user selects "Done," the user environment may return to the theme selection area shown in FIG. 2 with adjusted values applied to the selected theme 212. If the user selects "Try It," a full-screen preview may be displayed of the selected environment area according to the values of user-configurable elements 314 in configuration area 313. If the user selects "Reset," the selected theme 212 and related parameters are returned to their original values. In some embodiments, the original values may be a preset default state. In some embodiments, the original values may be the values as set when the user entered the theme configuration area of the user environment. If the user selects "Undo," the most recent user action may be reversed. For example, as shown in FIG. 3A, the value of a slider 315A may be returned to its previous value, the previously-selected color of color selector 316A may be re-selected, or the value of the toggle 317A may be changed to its other state. If the user selects "Cancel," the user environment may return to the theme selection area shown in FIG. 2 with the theme and configuration values set as when the user entered the theme configuration area of the user environment. Additional options may be presented to the user if the theme option list 332 is selected similar to those discussed in connection with FIG. 2, such as "Add Theme Image," "Save to Themes," "My Color Palettes," and "My Effects."

Figure 4:
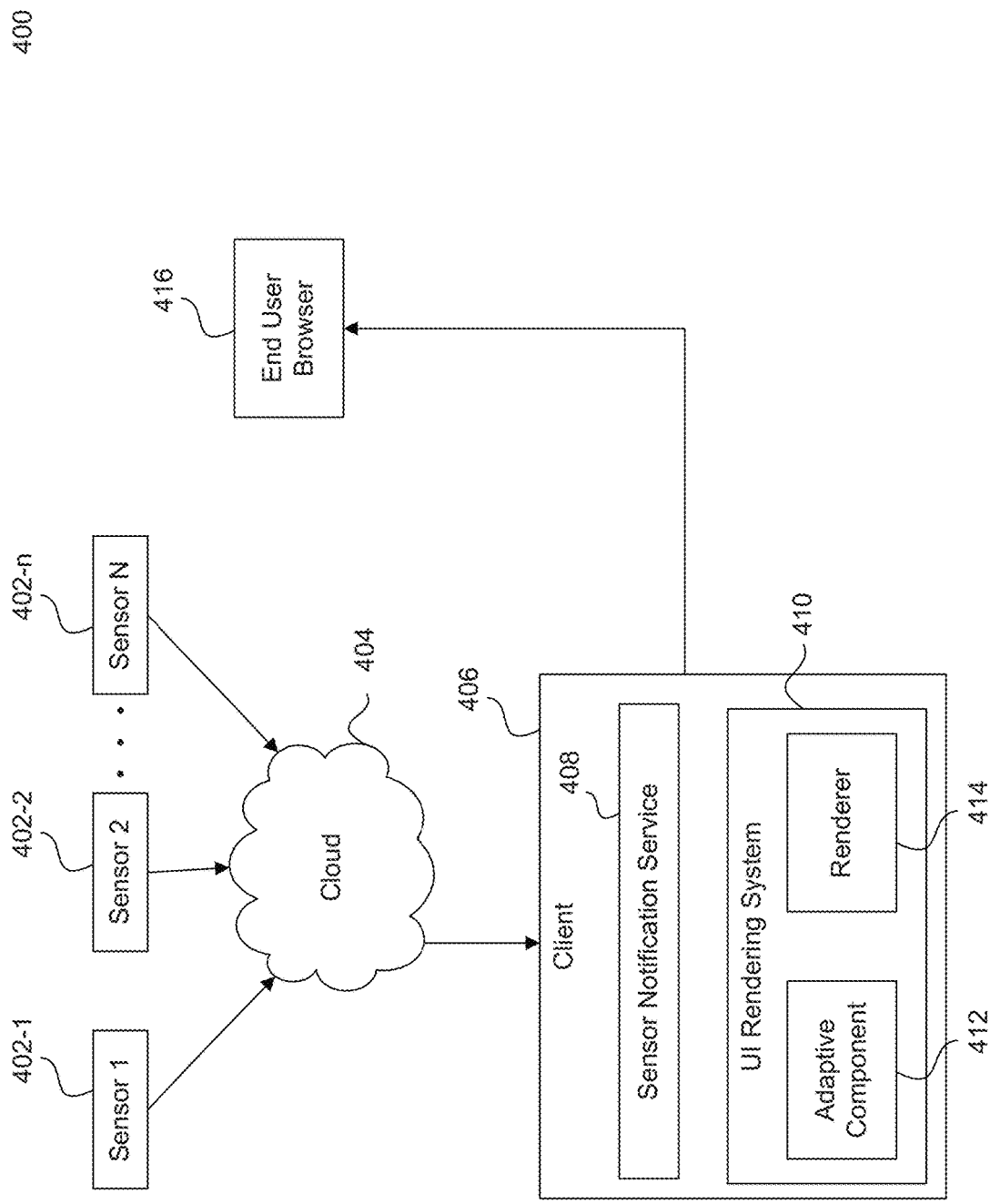
FIG. 4 shows a system process diagram for the use of data sensors to dynamically vary the themed user environment, according to some embodiments.

FIG. 4 shows a cloud computing environment 400 that uses data sensors to dynamically vary the themed user environment, according to an embodiment. The cloud computing environment 400 includes sensors 402-1 through 402-N that communicate via a cloud network 404. Sensors 402 may be any hardware or software sensor that senses various ambient aspects of the location where the end user browser 416 is displayed. Sensors 402 convert these aspects into digitally retrievable parameters. For example, the sensors 402 may be a light sensor, a temperature sensor, a video sensor connected to a camera, or an audible sensor connected to a microphone, to name a few examples. As shown, the cloud network 404 communicates with a client device 406. Cloud network 404 may be any wired or wireless communication network, medium or protocol, such as but not limited to Bluetooth, Wi-Fi, Ethernet, cellular, etc., or any combination thereof. The cloud network 404 may be one or more servers distributed over a Local Area Network (LAN), Wide Area Network (WAN), Metropolitan Area Network (MAN), etc. The client device 406 includes a sensor notification service 408 and a user interface (UI) rendering system 410. Examples of client devices 406 may include mobile devices, standalone workstations, personal computers (PCs), phones, tablets, smart watches, etc. In addition, the UI rendering system 410 includes an adaptive component 412 and a renderer 414. The cloud computing environment 400 further includes an end user browser 416. Examples of the end user browser 416 may include various browsers, such as INTERNET EXPLORER and GOOGLE CHROME, to name a few examples, for user interaction with the themed environment.

In the client device 406, the sensor notification service 408 is an engine configured to manage the distribution of the digitally retrievable parameters from the sensors 402. For example, sensor 402-1 may be a light sensor and sensor 402-2 may be a temperature sensor. The sensor notification service 408 receives the digitally retrievable parameters from the light and temperature sensor outputs and distributes the digitally retrievable parameters to the associated ambient light element 314G and 314H and weather element 314G and 314H, respectively. In an embodiment, the digitally retrievable parameters may include characteristics associated with the sensor. For example, if sensor 402 is a light sensor, the parameters may include a luminosity value, a gain value, and an infrared value. In another example, if sensor 402 is a temperature sensor, the parameters may include a temperature reading and a voltage level associated with the temperature reading. In another example, if sensor 402 is an audible sensor, the parameters may include a noise figure value in decibels (dB), a voltage level associated with the noise figure, and an attenuation value in dB. One skilled in the art will appreciate that the aforementioned lists are not exhaustive, and any aspect of characterizations associated with the sensors may be present within the scope of the present disclosure. In an embodiment, the sensor notification service 408 additionally stores a copy of the digitally retrievable parameters for each of the sensors 402 for later recall in a database in the client device 406, currently not shown in FIG. 4.

The adaptive component 412 is an engine, which maintains the relationship between the output of sensors 402 and associated data elements on the end user browser 416. For example, the adaptive component 412 may manage a configurable element 316G, such as ambient light, on the end user browser 416 and the associated light sensor 402-2. If a user adjusts the ambient light 316G slider on the end user browser 416, the adaptive component 412 may manage the real time adjustments of the movement of data in the user environment associated with the ambient light. Specifically, the adaptive component 412 may introduce variations to one or more aspects of the selected theme 212 in real time. For example, a user may move the slider for the palette variance 315A to 35% from 75%. In response, the adaptive component 412 will update a variable, such as a widget or function, tied to the palette variance 315A slider such that the value decreases from 75% to 35%.

The renderer 412 is an engine managing the visual display of the end user browser 416's GUI, according to an embodiment. Specifically, the renderer 412 manages the placement of the elements on the display of the end user browser 416; any modifications or selections to the user environment performed by the user; and, ensures the elements of the user environment adhere to the themed environment of the end user browser 416. In addition, the renderer 412 visually adjusts the selected theme 212 based on any modifications performed by the adaptive component 412. For example, as shown in FIG. 3A, if the toggle 317A for hue is turned to "off", the renderer 414 greys out the toggle 317A for hue to denote an inactive toggle. In another example, the renderer 412 visually changes the color of the home theme (preview) 321G based on the selection of the user-configurable elements in 313A and 313B in combination with sliders 224 and 524 adjustments. In another example, a user selecting "Add Theme Image" from the theme option list 232, the renderer 412 will highlight the "Add Theme Image" button to denote a selection to the user.

Figure 5:
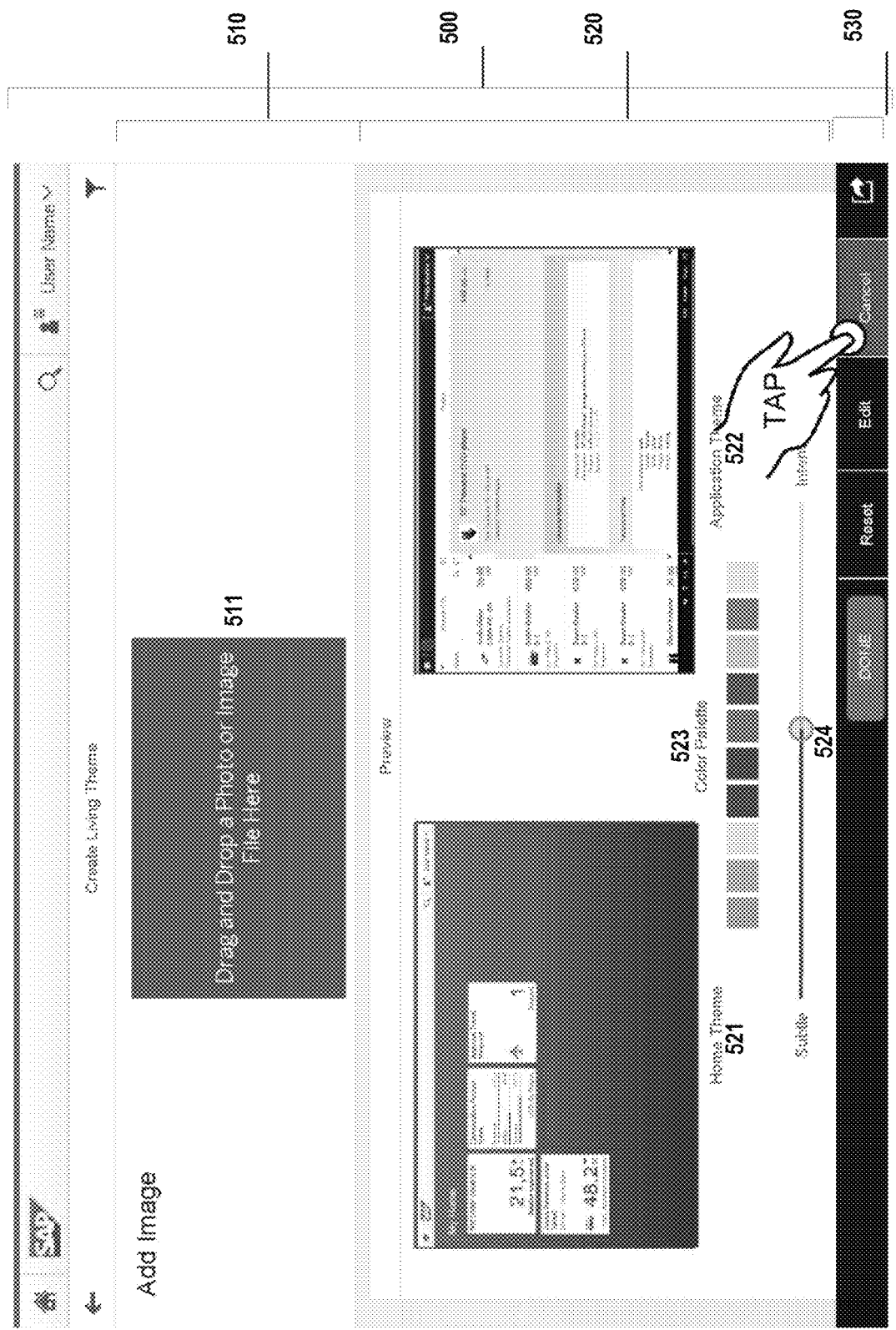
FIG. 5 shows an example GUI for importing a user-supplied artifact for automatic generation of a color palette and use in a theme, according to some embodiments.

FIG. 5 shows a GUI 500 for importing a user-supplied artifact for automatic generation of a theme color palette and use in a theme, according to an embodiment. The GUI 500 may comprise an import area 510, preview area 520, and theme menu bar area 530. The import area 510 may comprise a drag and drop area 511, and the preview area 520 may comprise a home screen preview area 521 and application preview area 522. The preview area 520 may further comprise a color palette 523 and a color palette slider 524.

In some embodiments, the drag and drop area 511 may initially be empty, and the preview area 520 may display a default theme in home screen preview area 521 and application preview area 522 with associated color palette 523 and color palette slider 524 set halfway. A user may drag a user-supplied artifact such as a photo or image over drag and drop area 511 and drop the user-supplied artifact in order to import the user-supplied artifact into the theme. The color of the dynamic and static elements of the theme can be determined by an analysis of the user-supplied artifact. In some embodiments, the user-supplied artifact is analyzed via a rasteration technique to determine the dominant colors of the user-supplied artifact. In certain embodiments, the rasteration can be described as follows:

1) An image of a×b pixel size is split into equal blocks of c×d pixel size, for example into blocks of 16×16.
2) Each RGB value of each of the pixels within each 4×4 block is calculated.
3) The mean of each RGB value of each of the pixels within the 4×4 blocks is calculated.
4) White and black values are discarded.
5) A new image is created with c×d pixels in the mean RGB value, and c and d are doubled, for example to 32×32.
6) The process continues until only the desired number of colors to be returned is reached.

In an embodiment, the renderer 414 may rescale the image to a desired image size for analysis when the size of the image is too large. For example, a desired image size may be 1024 pixels by 768 pixels. The renderer 414 may rescale the image to the desired image size that maintains the same color scheme as the larger image without loss of color information. In an embodiment, if the image size is too large for rescaling the image resulting in loss of color information, at minimum the dominant colors obtained will be returned and utilized by the system for determining a theme color palette.

One of ordinary skill in the art may understand that any appropriate method for determining the dominant colors of the user-supplied artifact may be applied to the user-supplied artifact. In certain embodiments, libraries such as Color Thief may be used to determine the dominant colors of the user-supplied artifact. In certain embodiments, additional colors may be calculated from the dominant colors for generation of a color palette to be used for the theme of the user environment. In certain embodiments, complementary and/or inverse colors are calculated from the dominant colors of the user-supplied artifact. Example pseudocode implementing the determination of a color palette from a user-supplied artifact is provided, wherein the user-supplied artifact is rendered using an HTML canvas. The example pseudocode is for illustrative purposes only, and is not intended to serve as a complete description of all of the elements and features of apparatus and systems that utilize the structures or methods described herein. Many other implementations may be apparent to those of skill in the art upon reviewing the disclosure.

```
//load new user-supplied artifact
var v = new Canvas( );
v.loadImage($('#droppedImage').data);
var c = new ColorAnalysisLibrary( );
c.analyse(v);
//c now contains a set of colors (c.colors)
//determine the brightness and saturation of each
var mostSaturated;
var mostBright;
var mostDark;
foreach (color col in c.colors)
{
//if our current most saturated color less saturated than the one we're
analyzing, then set it
    if (mostSaturated.saturation < col.saturation)
    {
      mostSaturated = col
    }
//if our current brightest color is less bright than the one we're analyzing,
then set it
//brightness as determined by R G B added together
    if (mostBright.brightness < col.brightness)
    {
      most Bright = col
    }
//if our current darkest color is less dark than the one we're analyzing,
then set it
//darkness as determined by R G B added together
    if (mostDark.brightness > col.brightness)
    {
      mostDark = col
    }
}
//complementary colors are determined (inverse)
var mostSaturatedInverse = createColorFromRGB(255 -
mostSaturated.Red, 255- mostSaturated.Green, 255 - mostSaturated.Blue)
//same for mostBright and mostDark
var mostBrightInverse = createColorFromRGB(255 - mostBright.Red,
255- mostBright.Green, 255-mostBright.Blue)
var mostDarkInverse = createColorFromRGB(255 - mostDark.Red,
255 - mostDark.Green, 255-mostDark.Blue)
//now we have a full palette.
```

In certain embodiments, the colors determined and/or calculated from the user-supplied artifact may be applied as the color palette of the theme of the user environment, while the user-supplied artifact may itself be used as a background to the home screen of the user environment. Color palette 523 may display the determined and/or calculated color palette of the user-supplied artifact, while color palette slider 524 allows the user to vary the colors of color palette 523. A more subtle color palette may decrease the variance, hue, tint, shade, tone, saturation, lightness, chroma, intensity, brightness, or other characteristics of color palette 523, while a more intense color palette may increase the variance, hue, tint, shade, tone, saturation, lightness, chroma, intensity, brightness, or other characteristics of color palette 523. The home screen preview area 521 and application preview area 522 may display a preview of the theme with the color palette of the user-supplied artifact as shown by color palette 523 and varied by color palette slider 524 applied to the various color elements of the theme. The user-supplied artifact may itself be used as a background to the home screen of the user environment.

In some embodiments, the color palette 523 and previews 521 and 522 of the theme according to the dominant colors of the user-supplied artifact may be generated as follows.

The load path for a cascading style sheet (CSS) theme of the home preview area 521 and application preview area 522 is parameterized. The color palette that was determined and/or calculated from the user-supplied artifact is composed into a new, custom CSS theme, which is passed to the parameterized CSS path load of the home preview area 521 and application preview 522, which are then rendered with the custom theme. The display of color palette 523 may be similarly generated from the determined and/or calculated colors of the user-supplied artifact. In certain embodiments, the elements of the user environment are identified and have the determined and/or calculated colors from the user-supplied artifact assigned to them. In certain embodiments, more saturated colors may be useful for aspects of the user environment such as highlighted items, title bars, links, etc. In certain embodiments, calculated complementary and/or inverse colors may be used for text to ensure contrast readability when highlighted. In certain embodiments, this may be done using a CSS stylesheet or programmatically using JavaScript. Example pseudocode implementing the assignment of determined and/or calculated colors from a user-supplied artifact to an aspect of the user environment is provided. The example pseudocode is for illustrative purposes only, and is not intended to serve as a complete description of all of the elements and features of apparatus and systems that utilize the structures or methods described herein. Many other implementations may be apparent to those of skill in the art upon reviewing the disclosure.

Example CSS Pseudocode:

```
//CSS
#BackGroundTile {background-gradient(from: mostSaturated,
to:mostSaturatedInverse)}
```

Example JavaScript Pseudocode:

```
//JavaScript
$("#BackGroundTile").attr("style","background-gradient(from: " +
mostSaturated + ", to: "+mostSaturatedInverse+")");
```

In certain embodiments, BrandSmart toggle 319 may be toggled "on" or "off." When toggled "off," the determination of the most dominant colors of a user-supplied artifact is unrestrained, and may progress as described above, resulting in a color palette comprising any colors within the color spectrum. When toggled "on", the system may restrict the user's customization parameters to those within a specified brand definition. When determining the most dominant colors of a user-supplied artifact, the resulting colors may be adapted to conform to a specified brand definition. In certain embodiments, colors outside of the parameters of the brand definition determined in the user-supplied artifact may be altered to conform to a specified brand definition such that the coloring of the user-supplied artifact conforms to the specified brand. The brand-conformed user-supplied artifact may then be utilized as a theme background without violating the intimacy of the brand color palette.

Figure 6:
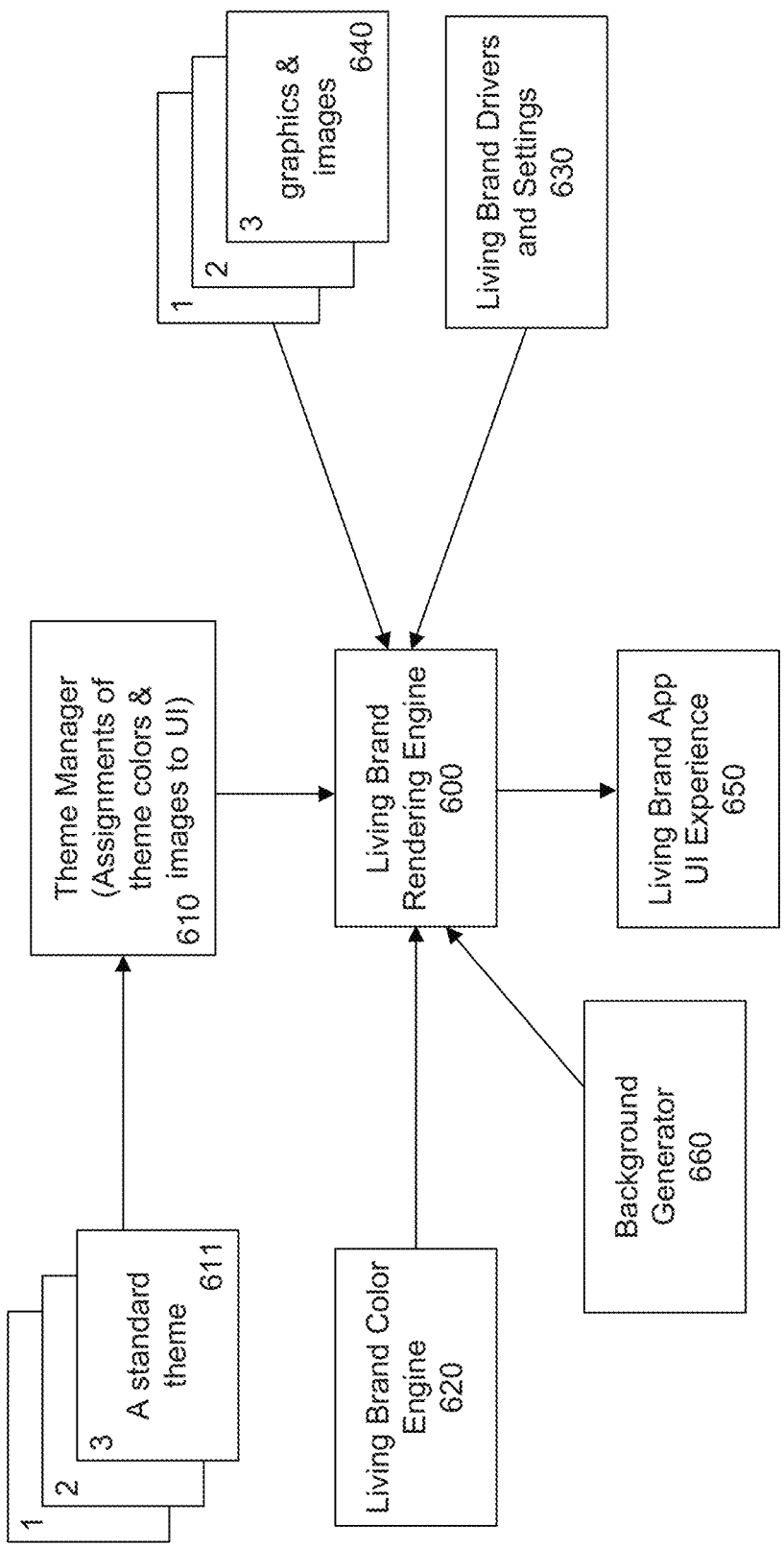
FIG. 6 shows a system process diagram, according to some embodiments.

FIG. 6 shows a system process diagram, according to an embodiment. In certain embodiments, Living Brand Rendering Engine 600 may primarily be responsible for generation of a dynamically varying themed interface for a user environment 650 according to the present disclosure. In certain embodiments, Living Brand Rendering Engine 600 may utilize inputs from various sources to generate a dynamically varying theme interface for a user environment 650, including, but not limited to a theme manager 610, a Living Brand Color Engine 620, Living Brand Drivers and Settings 630, and various graphics and images 640. In certain embodiments, Theme Manager 610 may utilize standard themes 611, comprising colors, sounds, animations, etc. associated with a particular theme, and correlate those colors, sounds, animations, etc. of standard themes 611 to the elements of an interface in a user environment. Living Brand Color Engine 620 may dictate appropriate color palettes within a particular brand definition, or may determine color palettes from user-supplied artifacts. Living Brand Drivers and Settings 630 may provide the necessary technical support to provide the functionality as described in the present disclosure. Graphics and images 640 may be pre-loaded into a user environment, or may be user-supplied artifacts. In an embodiment, the adaptive component 412 manages the control of the Living Brand Rendering Engine 600, the Living Brand Color Engine 620, the Living Brand Drivers and Settings 630, the graphics & images 640, the Living Brand App UI Experience 650, and the Theme Manager 610.

In an embodiment, the Living Brand Rendering Engine 600 may include one or more extensible modules. The extensible modules may be deployed in the same or separate system in any of the deployments described above. In addition, the extensible modules may be exported to any supported application in any device such as but not limited to a cellular phone, PC, tablet, or smart watch. In an embodiment, certain or all aspects (components) of the system in FIG. 6 may be embedded into an application client. For instance, one extensible module may be a background generator 660 for the themed home environment. The Living Brand Drivers and Settings 630 may define an "on" or "off" toggle for the background generator 660. By toggling the background generator 660 setting to "on" in the Living Brand Drivers and Settings 630, the Living Brand Rendering Engine 600 executes the background generator 660 extensible module.

In an embodiment, the background generator 660 is configured to continuously animate the background of the selected theme 212 without the need for user navigation selections or inputs. The background generator 660 automatically introduces subtle changes using various methods and/or a combination of methods such as, mathematical algorithms, an auto randomizer, and a configuration based on a manual selection of parameters, settings, options, including the ability to switch off. The background generator 660 may be used to continuously automate a background comprising a preset selected theme 212, a user-loaded artifact, or a polygonal background. A user may define whether the background contains the preset selected theme 212, the user-loaded artifact, or the polygonal background based on the selection of the selected theme 212. In an embodiment, when the background generator 660 uses the preset selected theme 212 or the user-loaded artifact, the background generator 660 auto-randomizes subtle variations of the theme. In an alternative embodiment, when the background generator 660 uses the polygonal background, the background generator 660 auto-randomizes the movement of various polygons across the background. This polygonal movement functionality will be described in FIG. 7 below.

The components of FIG. 6 may be implemented in software, firmware, hardware, or any combination thereof. Implementations may be implemented in a computing system where some, all, or none of the components of FIG. 6 are implemented on a user device. In certain embodiments, some, all, or none of the components of FIG. 6 may be implemented in a cloud computing environment. Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. In certain embodiments, some, all, or none of the processing associated with the configuration and generation of a dynamically varying theme interface for a user environment may be performed on a back-end component to ensure acceptable performance of a user device. In certain embodiments, some, all, or none of the processing associated with the configuration and generation of a dynamically varying theme interface for a user environment may be performed on a front-end component in order to, for example, conserve communication bandwidth or in instances where no communication network is present.

Figure 7:
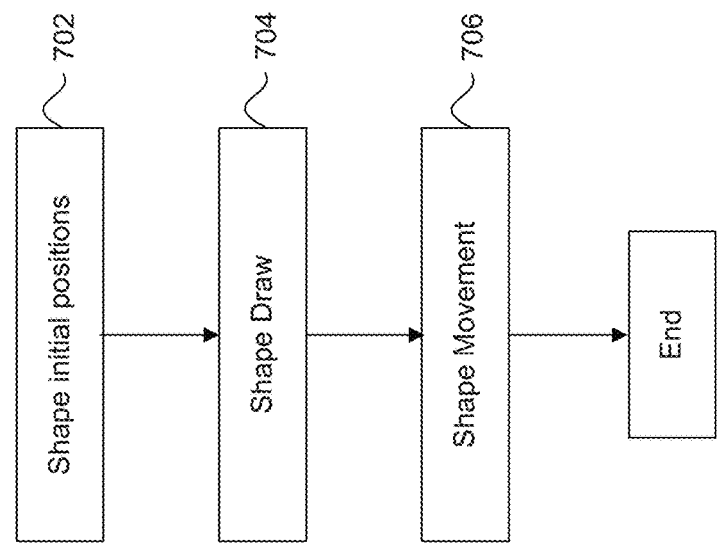
FIG. 7 is a flowchart illustrating an operation of a background generator, according to some embodiments.

FIG. 7 is a flowchart for a method 700 for operation of the background generator 660, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 7. However, method 700 is not limited to that example embodiment.

In 702, the background generator 660 shapes the initial positions of polygons on the themed environment. In an embodiment, the background generator 660 partitions the themed environment into one or more partition areas on the display screen. For example, the background generator 660 may partition the display of the end user browser 416 into three partition areas. In some embodiments, the partition areas are not displayed to the selected theme 212. More or less than three partitioned areas are possible, but three partitioned areas will be used in this description for illustrative purposes. In an embodiment, the number of partitioned areas may be configured in the Living Brand Drivers and Settings 630. The location of the centers for each of the partition areas are randomly set based on a random seeded function. In particular, the random seeded function receives two input parameters to calculate a location position on the display. For example, the two input parameters may be the X and Y positions around which a random number is generated. In an alternative embodiment, more than two parameters may be used to calculate the random seeded function. In some embodiments, the calculations for the random seeded function may use the width and the height of the current display the background generator 660 is executing on. In an alternative embodiment, the background generator 660 may use the display of the exported system to calculate the centers of the partitioned areas. The X and Y positions for each shape may be calculated as follows:

1) Shape 1 X-Position is random(0, width/2)
2) Shape 1 Y-Position is random(0, height/2)
3) Shape 2 X-Position is random(width/2, width)
4) Shape 2 Y-Position is random(0, height/2)
5) Shape 3 X-Position is random(width/4, width/4*3)
6) Shape 3 Y-Position is random(height/2, height)

In some embodiments, the partitioned areas may exist in a separate location on the display. The partitioned areas may be non-overlapping and contain one or more polygonal shapes. In an embodiment, the polygonal shapes may contain one or more curves. The number of curves may be configured in the Living Brand Drivers and Settings 630. For example, the number of curves for each shape may be configured to be four. The polygons may include one or more Bezier curves used to draw a shape in the partitioned areas. After the X and Y positions for each of the shapes are defined, each of the shapes may be drawn in their respective partitioned areas, as explained below.

In 704, the background generator 660 draws the shapes on the themed environment. Continuing with the Bezier curves example from above, an API such as a Canvas API bezierCurveTo function, contained within the background generator 660, may be used to draw the shapes in each of the partitioned areas. The bezierCurveTo function draws the Bezier curves through each of the X and Y positions defined in 702. In order to draw a smooth convex Bezier shape, control points are first calculated with respect to the center point of the shape, the location of the shapes, and tangents of the curves. In order to calculate the control points for Bezier curves and center points, the following helper objects and helper variables shown below may be defined:

1) Point—an object represented by X and Y coordinates on a canvas,
2) CenterRange-a range of points in 2D area on the screen where the shape center will be located. It is randomly calculated per each browser session of the end user browser 416 and is used below to calculate the shape's control points,
3) Radius-a randomly calculated radius of the shape which defines its extent,
4) Center-a point randomly calculated within a CenterRange, and
5) SquarePoints-array of points where each point is a middle point on the edge of a square that has an incircle defined by a Center point. Square points are calculated by the radius and center point for each shape.

In an embodiment, a helper object, such as a shape object, may have the following properties:

1) CenterPoint—a center point,
2) BezierCurves—an array of BezierCurve objects, which includes:
    a. BezierCurve—an object which represents a Bezier curve with the following properties:
        i. startPoint—a point where the drawing of the curve will start,
        ii. endPoint—a point where the curve will end,
        iii. controlPoint1—first control point, and
        iv. controlPoint2—second control point.

In an embodiment, the calculation of the helper objects and helper variables are defined below. Example pseudocode implementing the calculation of the control points is shown below. The example pseudocode is for illustrative purposes only, and is not intended to serve as a complete description of all of the elements and features of apparatus and systems that utilize the structures or methods described herein. Many other implementations may be apparent to those of skill in the art upon reviewing the disclosure.

1) CenterRange is calculated for each shape:
```
    var canvasWidth = (window.innerWidth > 0) ? window.innerWidth :
        screen.width;
    var canvasHeight = (window.innerHeight > 0) ?
        window.innerHeight :
        screen.height;
    var centerRanges = {
        cpr1 : new Range(0, canvasWidth / 4, 0, canvasHeight / 4),
        cpr2 : new Range(canvasWidth / 2, canvasWidth, 0,
            canvasHeight / 4),
        cpr3 : new Range(canvasWidth / 4, 3 * canvasWidth / 4,
            canvasHeight * 3 / 4, canvasHeight)
    };
```
2) Center point is calculated for each shape randomly in the corresponding range:
```
    Center1 ← getRandomPoint (centerRanges.cpr1)
    //getRandomPoint function
    getRandomPoint : function (range) {
        var x = Math.floor(Math.random( ) * (range.x.max −
    range.x.min) + range.x.min) + range.x.min) ,
        var y = Math.floor(Math.random( ) * (range.y.max −
    range.y.min) + range.y.min);
        return new Point(x, y);
    },
```
3) Radius is calculated from each shape:
```
    Radius1 ← getRandomRadius (radiusRange)
    //radiusRange function
    radiusRange : {
        min : 800,
        max : 900
    }
    //getRandomRadius function
    getRandomRadius : {
        radius = Math.random(this.radiusRange.max −
            this.radiusRange.min) + this.radiusRange.min;
    }
```
4) Square points:
```
    _getSquarePoints: function(radius, center)_{
        var squarePoints = [ ];
        squarePoints[0] = new Point(center.x + radius, center.y);
        squarePoints[1] = new Point(center.x, center.y − radius);
        squarePoints[2] = new Point(center.x − radius, center.y);
        squarePoints[3] = new Point(center.x, center.y + radius);
        return squarePoints;
    }
```
5) Calculating bezier curves:
```
    squarePoints = _getSquarePoints(Radius1, Center1);
    startPoint = squarePoints[0];
    endPoint = squarePoints[1];
    controlPoint1 = new Point(startPoint.x, startPoint.y − radius /2);
    controlPoint2 = new Point(startPoint.x − radius / 2, startPoint.y −
    radius);
    bezierCurves.push = new Point({startPoint: startPoint, endPoint:
        endPoint, controlPoint1: controlPoint1,
        controlPoint2:controlPoint2});
```

Once the Bezier curves are created via the bezierCurves.push function, the control points, controlPoint1 and controlPoint2, are fed into the bezierCurveTo API and the renderer 414 paints the shapes on the screen. In an embodiment, the bezierCurveTo API function may use the following equations to draw the Bezier Curves:

$$X = startX1 + \cos(angle * i) * ((0.2083 * screen.width) + random((0.4166 * screen.width))); \quad 1)$$

$$Y = startY1 + \sin(angle * i) * ((0.3333 * screen.height) + random((0.6666 * screen.height))); \quad 2)$$

In an alternative embodiment, the bezierCurveTo API function may use internal equations to draw the Bezier Curves.

In the two equations above, startX1 and startY1 define the locational coordinates of the controlPoint1. In an embodiment, more than one controlPoint may exist, such as 10 controlPoints. In an embodiment, the angle is a number ranging from 0 to 180 degrees or 0 to pi in radians. In an embodiment, the "i" variable is a number ranging from 0 to the number of points between startPoint and endPoint. The resultant X and Y coordinates for each calculation defines the locational coordinates for each of the Bezier curves drawn on the display. In an embodiment, the shapes may be drawn over a range of display pixels. For example, shape 1 and shape 3 may be drawn with three control points, where each shape is drawn over a minimum spanning distance of 300 pixels and a maximum spanning distance of 900 pixels around the CenterPoint.

In 706, the background generator 660 animates the movement of the shapes. In an embodiment, after the shape has been drawn on its respective partition on the screen, the controlPoints may randomly move to generate the background movement. In an embodiment, the background generator 660 uses mathematical algorithms to move the control points. For example, a liner interpolation or lerp function may be used to move the control points back and forth between a range of discrete set data points. In an embodiment, the lerp function results in a movement across a straight line over a configurable duration of time. In an alternative embodiment, the lerp function results in a movement across a straight line over a set or hard-coded duration of time. In an embodiment, the movement may be interpolated over $\frac{1}{10}^{th}$ of a distance of the total range. For example, in some embodiments, the following equations may be used to define movement of the X and Y positions for each of the control points:

$$\text{float } X = \text{lerp}(\text{form } 1[i].\text{position}.x, \text{formNew1}[0][i], 0.02); \quad 1)$$

$$\text{float } Y = \text{lerp}(\text{form } 1[i].\text{position}.y, \text{formNew1}[1][i], 0.02); \quad 2)$$

In an embodiment, the creation of the X and Y positions may be created and shaped over a predetermined period of time. For example, the predetermined period of time may be 500 milliseconds. In an embodiment, a restart animation time may be set to define the amount of time required before starting the animation over again. For example, the restart animation time may be 500 milliseconds.

In an embodiment, the control points for each of the shapes may use different predetermined periods of time as well as different restart animation times. These differences create variations in shape movement between each of the respective shape, so no one shape moves like the other. In an embodiment, the predetermined period of time and the restart animation time are defined in the Living Brand Drivers and Settings 630.

In an embodiment, the movement may also apply during various user interactions with the screen. For example, when a user logins in to the system, the background generator 660 begins execution of the controlPoints movements. In another example, when a user clicks on an application tile 130 from the home screen 110 as shown in FIG. 1 to open the application, such as the application shown in application preview area 322, the background generator 660 may vary the movement of the controlPoints in a different manner than before the user clicked on the application tile 130. In another example, when a user closes an application, the background generator 660 may vary the movement of the controlPoints in a different manner than before the user closed the application. In another embodiment, more controlPoints may be added as a result of the various actions to further the alterations of the shapes. In another embodiment, the background generator 660 creates a parallax effect for each of the shapes on the themed environment. For example, when the user interacts with an application in the forefront of the background, the shapes in the background slowly move in a clockwise or counter-clockwise direction. In another embodiment, the background generator 660 moves the shapes in a direction, distance, or speed corresponding to one or more user GUI application interactions within a display screen. For example GUI interactions may include but are not limited to at least one of scrolling a screen left/right or up/down, moving a mouse pointer on a screen left/right or up/down or any combination thereof, selecting an application element located on a left, right, top, bottom, center portion on a GUI display or any combination thereof, of the end user browser 416. In an embodiment, the movement of the shapes may depend upon the displacement of the application interactions in pixels and the direction in which the user executes interactions or combinations of interactions across a GUI display. For example, shape 1 may move in the same direction as the application interaction at a fourth of the pixel distance; shape 2 may move in the same direction as the application screen at a half of the pixel distance, and, shape 3 may move in the same direction as the application screen at the same pixel distance.

Figure 8A:
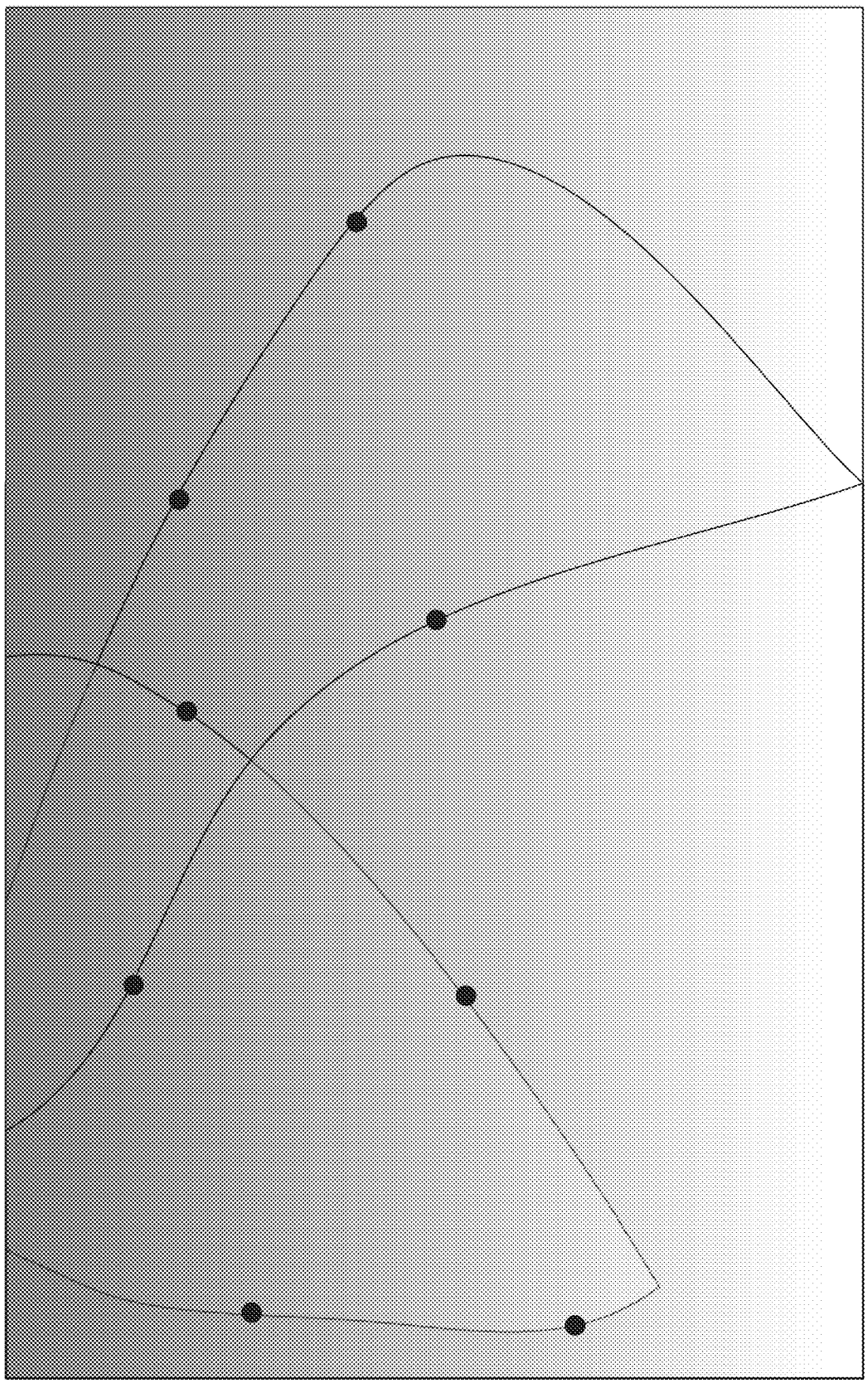
FIGS. 8A-8C are exemplary screenshots illustrating example outputs from a background generator, according to some embodiments.
Figure 8B:
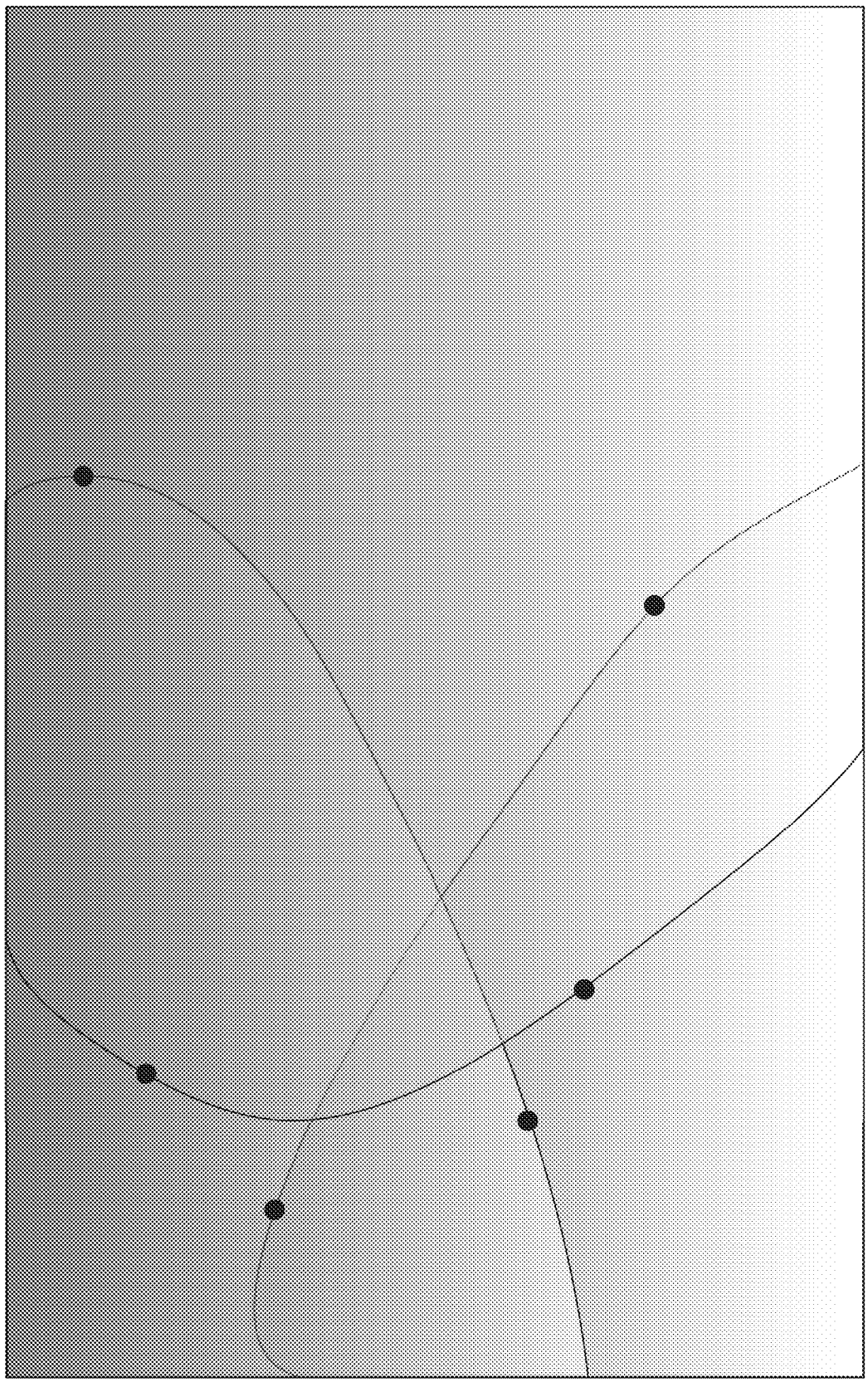
Figure 8C:
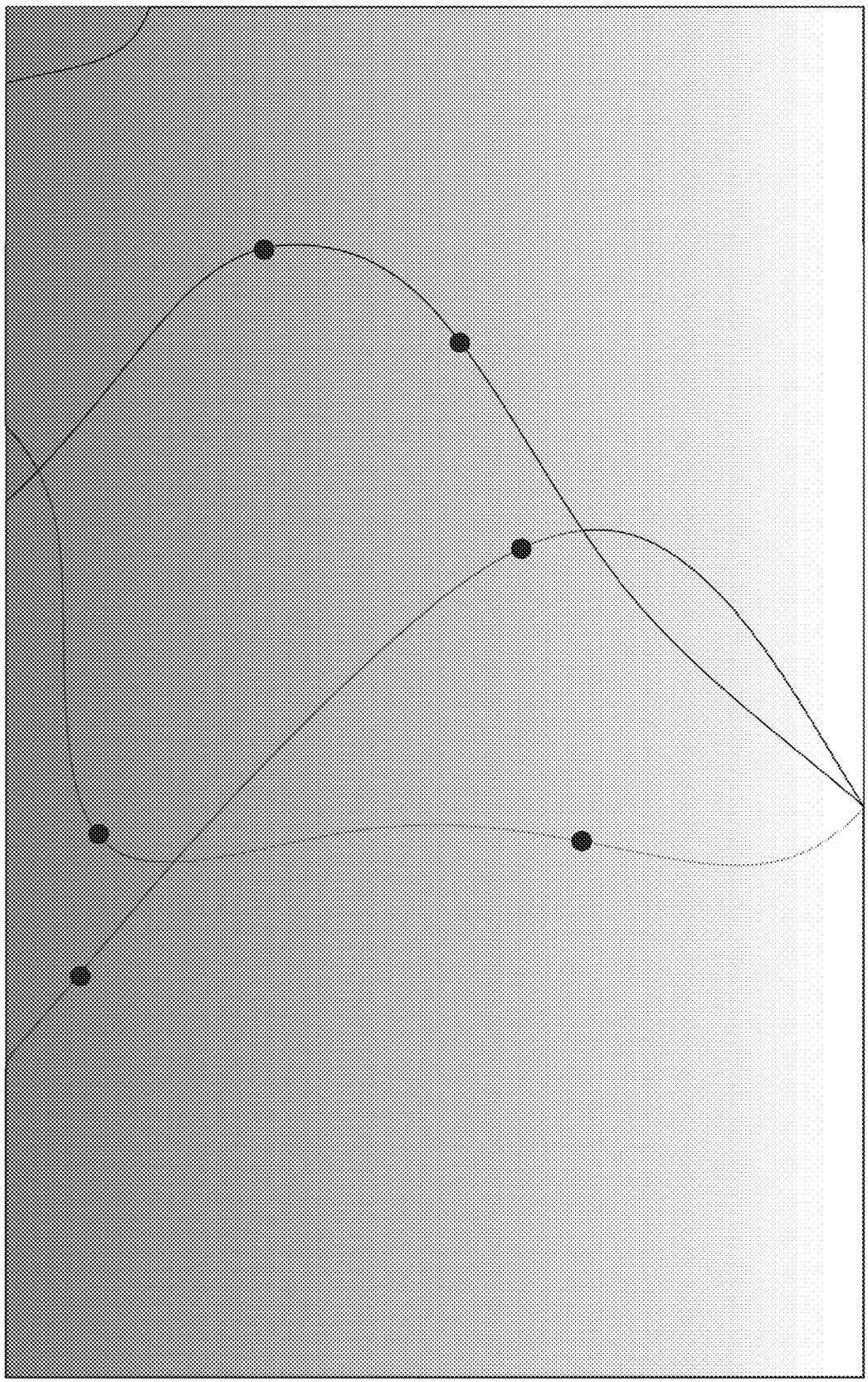

FIGS. 8A-8C are exemplary screenshots illustrating output of polygonal shapes from the background generator 660, according to an embodiment. FIGS. 8A-8C may be used in a single display in a device such as but not limited to a PC, a tablet, a smart phone, a smart watch, a vehicular display screen, and a television, according to example embodiments. The output shown in FIGS. 8A-8C illustrates example Bezier curves during different movement variations of the control points. Furthermore, FIGS. 8A-8C illustrate example control points corresponding to Bezier curves in polygonal shapes according to embodiments discussed above.

Figure 9:
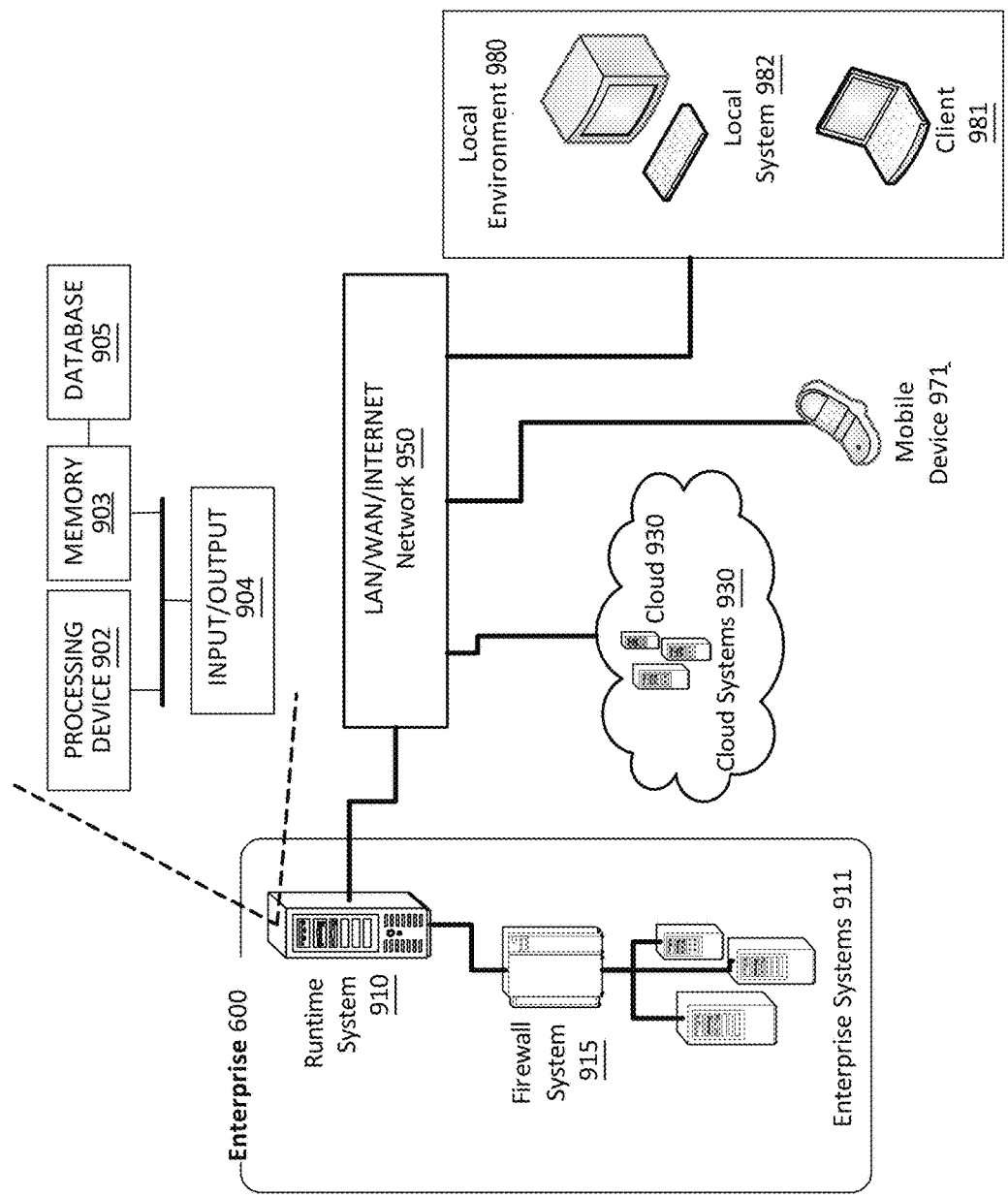
FIG. 9 shows an exemplary architecture of systems, according to some embodiments.

FIG. 9 shows an exemplary architecture of systems according to an example embodiment. Runtime system 910, may be connected to firewall system 915 and network 950. Network 950 may include a LAN, WAN, VPN, or the Internet. Mobile device 971, the local systems 982 and clients 981 in local environment 980, and the cloud systems 930 in the cloud environment 930 may also be connected to the network 950. The firewall system 915 may also be connected to the enterprise systems 911 and may provide an additional layer of security for enterprise systems 911 by preventing unauthorized access to these systems 911.

Each of the systems, clients, and devices in FIG. 9 may comprise any combination of one or more of inter alia a desktop computer, a notebook computer, a laptop computer, a tablet, a smartphone, a smart watch, etc.

Each of the systems, clients, and devices in FIG. 9 may contain a processing device 902, memory 903 containing a database 905, and an input/output interface 904, all of which may be interconnected via a system bus. In various embodiments, each of the systems 911, 971, 910, 915, 930, 981, and 982 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 903 may contain different components for retrieving, presenting, changing, and saving data. Memory 903 may include a variety of memory devices, for example, Dynamic Random Access Memory (DRAM), Static RAM (SRAM), flash memory, cache memory, and other memory devices. Additionally, for example, memory 903 and processing device(s) 902 may be distributed across several different computers that collectively comprise a system.

Processing device 902 may perform computation and control functions of a system and comprises a suitable central processing unit (CPU). Processing device 902 may comprise a single integrated circuit, such as a microprocessing device, or may comprise any suitable number of integrated circuit devices and/or circuit boards working in cooperation to accomplish the functions of a processing device. Processing device 902 may execute computer programs, such as object-oriented computer programs, within memory 903.

Further, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. For example, some of the described embodiments may include software and hardware, but some systems and methods consistent with the present disclosure may be implemented in software or hardware alone. Additionally, although aspects of the present disclosure are described as being stored in memory, this may include other computer readable media, such as secondary storage devices, for example, hard disks, floppy disks, or CD ROM; the Internet or other propagation medium; or other forms of RAM or ROM.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

Based on the teachings contained in this disclosure, it will be apparent to persons skilled in the relevant art(s) how to make and use the disclosure using data processing devices, computer systems, and/or computer architectures other than that shown in FIG. 9. In particular, embodiments may operate with software, hardware, and/or operating system implementations other than those described herein.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

In addition, in the foregoing Detailed Description, various features may be grouped or described together for the purpose of streamlining the disclosure. This disclosure is not to be interpreted as reflecting an intention that all such features are required to provide an operable embodiment.

Particular method elements or steps described herein could be executed in different orders without departing from the scope or spirit of the disclosure.

What is claimed is:

1. A method, comprising;
generating a background for a graphical user interface (GUI);
partitioning the background into partitioned areas;
drawing a polygonal shape in each of the partitioned areas, wherein each polygonal shape includes one or more control points;
animating movement of each polygonal shape by varying a position of the one or more control points; and
moving the position of the one or more control points in response to a user interaction with an application tile overlaid on the background of the GUI.

2. The method of claim 1, wherein the drawing further comprises:
drawing the polygonal shape using a Bezier curve that passes through the one or more control points.

3. The method of claim 1, wherein the drawing further comprises:
determining a number of curves to use for drawing the polygonal shape by accessing instructions stored in a brand definition data structure.

4. The method of claim 1, wherein the partitioning further comprises:
determining a number of partitioned areas by accessing instructions stored in a brand definition data structure.

5. The method of claim 1, wherein the drawing further comprises:
determining a center point for the polygonal shape by applying dimensions of a display area occupied by the background to a random seeded function.

6. The method of claim 1, wherein the drawing further comprises:
drawing a first polygonal shape in a first partitioned area; and
drawing a second polygonal shape in a second partitioned area, and wherein the animating further comprises:
moving the one or more control points of the first polygonal shape at a first predetermined rate; and
moving the one or more control points of the second polygonal shape at a second predetermined rate that differs from the first predetermined rate.

7. The method of claim 1, wherein the animating further comprises:
repeatedly moving the position of the one or more control points using a linear interpolation function to move the one or more control points between a first position and a second position within a range of discrete set data points.

8. A system comprising:
a memory; and
at least one processor coupled to the memory and configured to:
generate a background for a graphical user interface (GUI);
partition the background into partitioned areas;
draw a polygonal shape in each of the partitioned areas, wherein each polygonal shape includes one or more control points;
animate movement of each polygonal shape by varying a position of the one or more control points; and
move the position of the one or more control points in response to a user interaction with an application tile overlaid on the background of the GUI.

9. The system of claim 8, wherein to draw the polygonal shape, the at least one processor is further configured to:
draw the polygonal shape using a Bezier curve that passes through the one or more control points.

10. The system of claim 8, wherein to draw the polygonal shape, the at least one processor is further configured to:
determine a number of curves to use for drawing the polygonal shape by accessing instructions stored in a brand definition data structure.

11. The system of claim 8, wherein to partition the background, the at least one processor is further configured to:
determine a number of partitioned areas by accessing instructions stored in a brand definition data structure.

12. The system of claim 8, wherein to draw the polygonal shape, the at least one processor is further configured to:
determine a center point for the polygonal shape by applying dimensions of a display area occupied by the background to a random seeded function.

13. The system of claim 8, wherein to draw the polygonal shape, the at least one processor is further configured to:
draw a first polygonal shape in a first partitioned area; and
draw a second polygonal shape in a second partitioned area, and wherein to animate the movement of each polygonal shape, the at least one processor is further configured to:
move the one or more control points of the first polygonal shape at a first predetermined rate; and
move the one or more control points of the second polygonal shape at a second predetermined rate that differs from the first predetermined rate.

14. The system of claim 8, wherein to animate the movement of each polygonal shape, the at least one processor is further configured to:
repeatedly move the position of the one or more control points using a linear interpolation function to move the one or more control points between a first position and a second position within a range of discrete set data points.

15. A non-transitory computer-readable device having instructions stored thereon that, when executed by at least one computing device, cause the at least one computing device to perform operations comprising:
- generating a background for a graphical user interface (GUI);
- partitioning the background into partitioned areas;
- drawing a polygonal shape in each of the partitioned areas, wherein each polygonal shape includes one or more control points;
- animating movement of each polygonal shape by varying a position of the one or more control points; and
- moving the position of the one or more control points in response to a user interaction with an application tile overlaid on the background of the GUI.

16. The computer-readable device of claim 15, wherein the drawing further comprises:
- determining a number of curves to use for drawing the polygonal shape by accessing instructions stored in a brand definition data structure;
- determining a center point for the polygonal shape by applying dimensions of a display area occupied by the background to a random seeded function; and
- drawing the polygonal shape using a Bezier curve that passes through the one or more control points.

17. The computer-readable device of claim 15, wherein the partitioning further comprises:
- determining a number of partitioned areas by accessing instructions stored in a brand definition data structure.

18. The computer-readable device of claim 15, wherein the animating further comprises:
- repeatedly moving the position of the one or more control points using a linear interpolation function to move the one or more control points between a first position and a second position within a range of discrete set data points.

* * * * *